(12) United States Patent
Hase et al.

(10) Patent No.: US 10,717,895 B2
(45) Date of Patent: Jul. 21, 2020

(54) METHOD FOR FORMING MULTILAYER COATED FILM

(71) Applicants: KANSAI PAINT CO., LTD., Amagasaki-shi, Hyogo-ken (JP); TOYOTA JIDOSHA KABUSHIKI KAISHA, Toyota-shi, Aichi-ken (JP)

(72) Inventors: Masako Hase, Toyota (JP); Keiji Ambo, Miyoshi (JP); Yoshinori Narita, Toyota (JP); Hiroshi Nishinaka, Nagoya (JP); Yukihiro Ikeura, Nagoya (JP); Kazuki Matsubara, Miyoshi (JP)

(73) Assignees: KANSAI PAINT CO., LTD., Hyogo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/895,151

(22) Filed: Feb. 13, 2018

(65) Prior Publication Data
US 2018/0230326 A1 Aug. 16, 2018

(30) Foreign Application Priority Data
Feb. 15, 2017 (JP) .................................. 2017-026041

(51) Int. Cl.
| | | |
|---|---|---|
| C09D 161/28 | (2006.01) | |
| B05D 7/00 | (2006.01) | |
| C09D 125/14 | (2006.01) | |
| B05D 7/14 | (2006.01) | |
| C09D 133/10 | (2006.01) | |
| C09D 133/26 | (2006.01) | |
| C09D 167/02 | (2006.01) | |
| B05D 3/02 | (2006.01) | |
| C09D 133/06 | (2006.01) | |
| B05D 1/02 | (2006.01) | |
| C08L 61/28 | (2006.01) | |

(52) U.S. Cl.
CPC ......... C09D 161/28 (2013.01); B05D 3/0218 (2013.01); B05D 7/14 (2013.01); B05D 7/574 (2013.01); B05D 7/5723 (2013.01); C09D 125/14 (2013.01); C09D 133/066 (2013.01); C09D 133/10 (2013.01); C09D 133/26 (2013.01); C09D 167/02 (2013.01); B05D 1/02 (2013.01); B05D 7/572 (2013.01); B05D 2202/10 (2013.01); B05D 2350/65 (2013.01); C08L 61/28 (2013.01); C08L 2201/54 (2013.01)

(58) Field of Classification Search
CPC .... C09D 161/28; C09D 133/10; B05D 7/574; B05D 7/14; B05D 7/572; B05D 2350/65; B05D 7/5723; B05D 3/0218; B05D 2202/10; B05D 1/02
See application file for complete search history.

(56) References Cited

U.S. PATENT DOCUMENTS

| | | | |
|---|---|---|---|
| 5,741,552 A * | 4/1998 | Takayama | B05D 7/52 427/386 |
| 6,395,340 B1 * | 5/2002 | Wada | C08G 59/50 427/410 |
| 6,863,929 B2 | 3/2005 | Watanabe et al. | |
| 9,376,574 B2 | 6/2016 | Hayashi et al. | |
| 9,630,212 B2 | 4/2017 | Tsukamoto et al. | |
| 2003/0102217 A1 * | 6/2003 | Kasahara | B05D 7/532 204/507 |
| 2003/0158321 A1 | 8/2003 | Watanabe et al. | |
| 2005/0256252 A1 * | 11/2005 | Williams | C08G 18/0823 524/507 |
| 2006/0045965 A1 * | 3/2006 | Lin | B05D 5/066 427/162 |
| 2006/0121204 A1 | 6/2006 | Nakae et al. | |
| 2006/0188656 A1 * | 8/2006 | Katsuta | C09D 133/14 427/407.1 |
| 2008/0226891 A1 * | 9/2008 | Chiga | B05D 7/577 428/221 |
| 2009/0087667 A1 * | 4/2009 | Tomizaki | B05D 7/14 428/413 |
| 2009/0274846 A1 * | 11/2009 | Wada | C08G 18/6254 427/407.1 |
| 2011/0045192 A1 | 2/2011 | Nakashima et al. | |
| 2011/0108426 A1 | 5/2011 | Hayashi et al. | |
| 2011/0111242 A1 | 5/2011 | Tomizaki et al. | |

(Continued)

FOREIGN PATENT DOCUMENTS

| | | |
|---|---|---|
| CN | 101772382 A | 7/2010 |
| CN | 102076427 A | 5/2011 |
| CN | 104136135 A | 11/2014 |
| CN | 105121037 A | 12/2015 |
| JP | 10-337531 A | 12/1998 |

(Continued)

OTHER PUBLICATIONS

TransportWrap, http://www.transportwrap.com/faq.html, Retrieved on May 15, 2019, Posted on Mar. 14, 2007 (Year: 2007).*

(Continued)

Primary Examiner — Francisco W Tschen
(74) Attorney, Agent, or Firm — Sughrue Mion, PLLC

(57) ABSTRACT

A method for forming a multilayer coated film on an electrodeposition-coated alloyed hot-dip galvanized steel plate include step (1) of applying an aqueous intermediate coating composition (X), step (2) of applying an aqueous base coating composition (Y), step (3) of applying a clear coating composition (Z) containing an epoxide, and step (4) of heat-curing each coated film. The coating composition (X) contains a hydroxyl group-containing acrylic resin (A), a polyurethane resin (B), a hydroxyl group-containing polyester resin (C), a melamine resin (D), and an active methylene-blocked polyisocyanate compound (E). The ratio of (A) to (B) is controlled to a specific range, and an elongation at break, Young's modulus and Tukon hardness of the coated film of the coating composition (X) are controlled to specific ranges.

2 Claims, No Drawings

(56) References Cited

U.S. PATENT DOCUMENTS

| | | | |
|---|---|---|---|
| 2012/0045585 A1 | 2/2012 | Tsukamoto et al. | |
| 2013/0089731 A1* | 4/2013 | Imanaka | B05D 7/14 |
| | | | 428/336 |
| 2014/0096701 A1 | 4/2014 | Santos et al. | |
| 2014/0312542 A1 | 10/2014 | Takata et al. | |
| 2015/0004401 A1 | 1/2015 | Kojima et al. | |
| 2016/0083617 A1 | 3/2016 | Koyama et al. | |
| 2017/0252776 A1 | 9/2017 | Nakata et al. | |
| 2018/0281019 A1 | 10/2018 | Kawabata et al. | |

FOREIGN PATENT DOCUMENTS

| | | |
|---|---|---|
| JP | 2003-211085 A | 7/2003 |
| JP | 2006-239535 A | 9/2006 |
| JP | 2009-262001 A | 11/2009 |
| JP | 2010-253378 A | 11/2010 |
| JP | 2017-154089 A | 9/2017 |
| WO | 2005/075587 A1 | 8/2005 |

OTHER PUBLICATIONS

Office Action dated Sep. 26, 2019, issued by the United States Patent and Trademark Office in U.S. Appl. No. 15/939,812.
Communication dated Sep. 17, 2019 issued by the State Intellectual Property Office of P.R. China in corresponding Chinese Application No. 201810145228.8.
Office Action dated Jan. 28, 2020 by the United States Patent and Trademark Office in U.S. Appl. No. 15/939,812.
Notice of Allowance dated May 20, 2020 by the United States Patent and Trademark Office in U.S. Appl. No. 15/939,812.

* cited by examiner

METHOD FOR FORMING MULTILAYER COATED FILM

CROSS-REFERENCE TO RELATED APPLICATIONS

This application claims priority from Japanese Patent Application No. 2017-026041 filed on Feb. 15, 2017, the entire subject matter of which is incorporated herein by reference.

BACKGROUND OF THE INVENTION

Technical Field

The present invention relates to a method for forming a multilayer coated film for coating an automotive body, the multilayer coated film being excellent in the chipping resistance and the adhesive strength when bonding to a member.

Background Art

On an automotive body, particularly, on an exterior panel part thereof, a multilayer coated film including an undercoat film excellent in the anticorrosive property, an intermediate coated film excellent in the smoothness and chipping resistance, and a top coated film excellent in the appearance and resistance to an environmental load is usually formed on a steel plate for the purpose of imparting excellent anticorrosive property and appearance.

One of the performances required of the multilayer coated film of an automobile is chipping resistance (chipping: damage to a coated film caused when hit by a small pebble, etc. flying from road), and a function is imparted mainly to an intermediate coated film with an attempt to enhance the chipping resistance.

For example, Patent Document 1 discloses a method for forming a coated film using an intermediate coating composition containing (a) a urethane-modified polyester resin obtained by reacting an aliphatic diisocyanate compound with a hydroxyl group-containing polyester resin obtained by polycondensation of an acid component containing 80 mol % or more of isophthalic acid, and a polyhydric alcohol; (b) a melamine resin; (c) a hexamethylene diisocyanate compound blocked by an active methylene group-containing compound; (d) a nonaqueous dispersion resin having a core-shell structure; and (e) a flat pigment.

Patent Document 2 discloses a multilayer coated film on an external panel of an automotive body, etc., which is a multilayer coated film having formed therein, in the following order, an electrodeposition coated film, an intermediate coated film, a base coated film and a clear coated film, wherein at −20° C., the intermediate coated film has a Young's modulus of 35,000 kg/cm$^2$ or more and an elongation at break of 2% or less and the clear coated film has a Young's modulus of 35,000 kg/cm$^2$ or less and an elongation at break of 5% or more.

However, in the method for forming a coated film of Patent Document 1 and the multilayer coated film of Patent Document 2, the chipping resistance may be insufficient.

Patent Document 1: JP-A-2003-211085
Patent Document 2: JP-A-2006-239535

SUMMARY OF THE INVENTION

However, in the case of using an alloyed hot-dip galvanized steel plate as the steel plate above and forming the top coated film by using a clear coating composition containing a carboxyl group-containing compound and a polyepoxide, the chipping resistance is sometimes reduced, and further enhancement of the chipping resistance is needed.

For example, in the method for forming a coated film described in Patent Document 1, when an alloyed hot-dip galvanized steel plate is used as the steel plate, the chipping resistance may be insufficient. In the multilayer coated film described in Patent Document 2, when an alloyed hot-dip galvanized steel plate is used as the steel plate and the clear coated film is formed using a clear coating composition containing a carboxyl group-containing compound and a polyepoxide, the chipping resistance may be insufficient.

In an automotive manufacturing specification, an adhesive layer is usually formed on the top coated film, and a member, for example, a glass member such as front glass or rear glass, is fixed onto the multilayer coated film through the adhesive layer, but when, for example, the intermediate coated film is softened with the intention to enhance the chipping resistance, the multilayer coated film below the adhesive layer may cause cohesion failure, or separation may occur between an electrodeposition coated film and the intermediate coated film, resulting in defective bonding to the member.

Accordingly, an object in an aspect of the present invention is to provide a method for forming a multilayer coated film, ensuring that even when an alloyed hot-dip galvanized steel plate is used as the steel plate and a clear coating composition containing a carboxyl group-containing compound and a polyepoxide is used as a coating composition for forming the top coated film, a multilayer coated film having more excellent chipping resistance than ever before and also having excellent adhesion strength for bonding to a member such as glass member can be formed.

As a result of intensive studies, the present inventors have found that in a method for forming a multilayer coated film, including sequentially applying an aqueous intermediate coating composition, an aqueous base coating composition, and a clear coating composition containing a carboxyl group-containing compound and a polyepoxide on/above an electrodeposition-coated alloyed hot-dip galvanized steel plate, thereby forming a multilayer coated film composed of an intermediate coated film, a base coated film and a clear coated film, when the aqueous intermediate coating composition contains a hydroxyl group-containing acrylic resin (A) having a glass transition temperature in a specific range and a weight average molecular weight in a specific range, a polyurethane resin (B) having a glass transition temperature in a specific range, a hydroxyl group-containing polyester resin (C), a melamine resin (D), and an active methylene-blocked polyisocyanate compound (E) and when the ratio of the hydroxyl group-containing acrylic resin (A) to the polyurethane resin (B) in the aqueous intermediate coating composition is controlled to a specific range and the elongation at break, Young's modulus and Tukon hardness of the coated film formed are controlled to specific ranges, respectively, the above-described object can be attained. The present invention has been accomplished based on this finding.

That is, the present invention provides a method for forming a multilayer coated film on an electrodeposition-coated alloyed hot-dip galvanized steel plate, the method comprising the following steps (1) to (4):

step (1): applying an aqueous intermediate coating composition (X) to an electrodeposition coated film, thereby forming an intermediate coated film on the electrodeposition coated film;

step (2): after preheating, applying an aqueous base coating composition (Y) to the intermediate coated film, thereby forming a base coated film on the intermediate coated film;

step (3): after preheating, applying a clear coating composition (Z) containing from 40 to 60 parts by mass of a carboxyl group-containing compound and from 60 to 40 parts by mass of a polyepoxide, each based on 100 parts by mass of a solid content of resin components in the coating composition, to the base coated film, thereby forming a clear coated film on the base coated film; and step (4): heat-curing the intermediate coated film formed in the step (1), the base coated film formed in the step (2) and the clear coated film formed in the step (3), wherein the aqueous intermediate coating composition (X) contains a hydroxyl group-containing acrylic resin (A) having a glass transition temperature (Tg) of 5 to 15° C. and a weight average molecular weight of 30,000 to 40,000, a polyurethane resin (B) having a glass transition temperature (Tg) of −50° C. or less and having a polyether skeleton, a hydroxyl group-containing polyester resin (C), a melamine resin (D), and an active methylene-blocked polyisocyanate compound (E), a ratio of the hydroxyl group-containing acrylic resin (A) to the polyurethane resin (B) is from 20/10 to 30/10 in terms of solid content ratio, and the heat-cured coated film of the aqueous intermediate coating composition (X) has an elongation at break at 20° C. of 20 to 30%, a Young's modulus of 5,000 to 6,000 MPa, and a Tukon hardness of 4 to 6.

The method for forming a multilayer coated film includes sequentially applying, on/above an electrocoated alloyed hot-dip galvanized steel plate, an aqueous intermediate coating composition, an aqueous base coating composition, and a clear coating composition containing a carboxyl group-containing compound and an epoxide to form a multilayer coated film including an intermediate coated film, a base coated film and a clear coated film, and the aqueous intermediate coating composition contains a hydroxyl group-containing acrylic resin (A) having a glass transition temperature in a specific range and a weight average molecular weight in a specific range, a polyurethane resin (B) having a glass transition temperature in a specific range, a hydroxyl group-containing polyester resin (C), a melamine resin (D), and an active methylene-blocked polyisocyanate compound (E), the ratio of the hydroxyl group-containing acrylic resin (A) to the polyurethane resin (B) in the aqueous intermediate coating composition is controlled to a specific range, and the elongation at break, Young's modulus and Tukon hardness of the coated film formed are controlled to specific ranges, respectively. Thanks to such a configuration, even when an alloyed hot-dip galvanized steel plate is used as the steel plate and an acid/epoxy crosslinkable resin is used in the clear coating composition, the multilayer coated film can have more excellent chipping resistance than ever before, and the adhesion strength for bonding of a member can be enhanced, specifically, breakage of the multilayer coated film in the glass bonding part can be prevented.

DETAILED DESCRIPTION OF THE INVENTION

In the method for forming a multilayer coated film on an electrodeposition-coated alloyed hot-dip galvanized steel plate in an aspect of the present invention (hereinafter may be referred to as "the method of the present invention"), the method includes the following steps (1) to (4):

step (1): applying an aqueous intermediate coating composition (X) to an electrodeposition coated film, thereby forming an intermediate coated film on the electrodeposition coated film;

step (2): after preheating, applying an aqueous base coating composition (Y) to the intermediate coated film, thereby forming a base coated film on the intermediate coated film;

step (3): after preheating, applying a clear coating composition (Z) containing from 40 to 60 parts by mass of a carboxyl group-containing compound and from 60 to 40 parts by mass of a polyepoxide, each based on 100 parts by mass of a solid content of resin components in the coating composition, to the base coated film, thereby forming a clear coated film on the base coated film; and step (4): heat-curing the intermediate coated film formed in the step (1), the base coated film formed in the step (2) and the clear coated film formed in the step (3).

Subsequently to step (4), a step of forming an adhesive layer on the clear coated film may be provided as step (5).

The method for forming a multilayer coated film of the present invention is described in detail below.

The material to be coated to which the method for forming a multilayer coated film of the present invention is applied, is an electrodeposition-coated alloyed hot-dip galvanized steel plate and is usually used for an automotive body. A material of the automotive body may be appropriately subjected to a conventional surface treatment.

The electrodeposition coating composition that can be used for electrodeposition coating may be either a cationic resin-based composition or an anionic resin-based composition and may be either a water-soluble composition or a water-dispersible composition, and a coating composition known per se can be used. In coating an automobile, from the standpoint of anticorrosive properties or the like, a cationic resin-based composition is usually used, and a cationic electrodeposition coating composition containing a cationic resin can be suitably used also in the method of the present invention.

Specific examples of the cationic electrodeposition coating composition include a cationic electrodeposition coating composition containing a cationic base resin having a cationic group and a crosslinking functional group such as hydroxyl group, carboxyl group and amino group (e.g., an epoxy resin, an acrylic resin, a polybutadiene resin, each modified with an amino group-containing compound), and a crosslinking agent such as blocked polyisocyanate compound, epoxy resin and melamine resin.

In the cationic electrodeposition coating composition, it is preferred that a neutralizer for the base resin, a color pigment, an anticorrosive pigment, an extender pigment, a hydrophilic organic solvent, etc. are usually further blended, if desired.

The electrodeposition coating composition can be applied by an ordinary method depending on an electrodeposition coating composition to be used.

In the case of applying a cationic electrodeposition coating composition, specifically, electrodeposition coating may be performed in a usual manner, for example, by diluting the coating composition with deionized water to a solids mass concentration of about 5 mass % to about 40 mass % and keeping the pH usually at 5.5 to 8.0. The coated film can be heat-cured at a temperature of usually about 140° C. to about 210° C., preferably at a temperature of 150° C. to 180° C., for usually 10 minutes to 60 minutes, preferably for 20 minutes to 30 minutes. The thickness of the coated film is preferably from about 10 μm to about 60 μm, particularly preferably from 15 μm to 30 μm, based on the cured coated film.

<Step (1)>

According to the method of the present invention, first, in the step (1), an aqueous intermediate coating composition (X) is applied onto an electrodeposition coated film of an electrodeposition-coated alloyed hot-dip galvanized steel plate to form an intermediate coated film. In general, the intermediate coating composition is applied for the purpose of forming an intermediate coated film layer between an undercoat film and a top coated film to contribute to enhancement of adhesion among layers of the multilayer coated film and covering the roughness on a surface of a material to be coated to improve finish appearance, chipping resistance, etc.

<<Aqueous Intermediate Coating Composition (X)>>

In the method of the present invention, the aqueous intermediate coating composition (X) contains a hydroxyl group-containing acrylic resin (A), a polyurethane resin (B), a hydroxyl group-containing polyester resin (C), a melamine resin (D), and an active methylene-blocked polyisocyanate compound (E), and additionally contains, if desired, a pigment (F) and an organic solvent (G).

<<Hydroxyl Group-Containing Acrylic Resin (A)>>

The hydroxyl group-containing acrylic resin (A) can be produced, for example, by (co)polymerizing at least one unsaturated monomer component having a hydroxyl group-containing unsaturated monomer and, depending on the case, further having other unsaturated monomers copolymerizable with the monomer above, under normal conditions.

The hydroxyl group-containing unsaturated monomer is a compound having at least one hydroxyl group and at least one polymerizable unsaturated bond per molecule, and examples thereof include a monoesterified product of a (meth)acrylic acid with a dihydric alcohol having a carbon number of 2 to 8, such as 2-hydroxyethyl (meth)acrylate, 2-hydroxypropyl (meth)acrylate, 3-hydroxypropyl (meth)acrylate and 4-hydroxybutyl (meth)acrylate; an ε-caprolactone-modified monoesterified product of a (meth)acrylic acid and a dihydric alcohol having a carbon number of 2 to 8; an allyl alcohol; and a (meth)acrylate having a polyoxyethylene chain in which the molecular terminal is a hydroxyl group.

In the present specification, (meth)acrylate is a generic term of acrylate and methacrylate, and (meth)acrylic acid is a generic term of acrylic acid and methacrylic acid.

Examples of the other unsaturated monomers copolymerizable with the above-described hydroxyl group-containing unsaturated monomer include an alkyl (meth)acrylate or cycloalkyl (meth)acrylate, such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl(meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, "Isostearyl Acrylate" (trade name, produced by Osaka Organic Chemical Industry, Ltd.), cyclohexyl (meth)acrylate, methylcyclohexyl (meth)acrylate, tert-butylcyclohexyl (meth)acrylate, cyclododecyl (meth)acrylate; an isobornyl group-containing unsaturated monomer such as isobornyl (meth)acrylate; an adamantyl group-containing unsaturated monomer such as adamantyl (meth)acrylate; an aromatic ring-containing unsaturated monomer such as styrene, α-methylstyrene, vinyltoluene and phenyl (meth)acrylate; an alkoxysilyl group-containing unsaturated monomer such as vinyltrimethoxysilane, vinyltriethoxysilane, vinyltris(2-methoxyethoxy)silane, γ-(meth)acryloyloxypropyltrimethoxysilane and γ-(meth)acryloyloxypropyltriethoxysilane; a perfluoroalkyl (meth)acrylate such as perfluorobutylethyl (meth)acrylate and perfluorooctylethyl (meth)acrylate; an unsaturated monomer having fluorinated alkyl group such as fluoroolefin; an unsaturated monomer having a photopolymerizable functional group such as maleimide group; a vinyl compound such as N-vinylpyrrolidone, ethylene, butadiene, chloroprene, vinyl propionate and vinyl acetate; a carboxy group-containing unsaturated monomer such as (meth)acrylic acid, maleic acid, crotonic acid and β-carboxyethyl acrylate; a nitrogen-containing unsaturated monomer such as (meth)acrylonitrile, (meth)acrylamide, dimethylaminopropyl (meth)acrylamide, dimethylaminoethyl (meth)acrylate, and an adduct of glycidyl (meth)acrylate with amines; an epoxy group-containing unsaturated monomer such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allyl glycidyl ether; a (meth)acrylate having a polyoxyethylene chain in which the molecular terminal is an alkoxy group; a sulfonic acid group-containing unsaturated monomer such as 2-acrylamido-2-methylpropanesulfonic acid, allylsulfonic acid, sodium styrenesulfonate, sulfoethyl methacrylate and its sodium salt or ammonium salt; a phosphoric acid group-containing unsaturated monomer such as 2-acryloyloxyethyl acid phosphate, 2-methacryloyloxyethyl acid phosphate, 2-acryloyloxypropyl acid phosphate and 2-methacryloyloxypropyl acid phosphate; an UV-absorbing group-containing unsaturated monomer such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone and 2-(2'-hydroxy-5'-methacryloyloxyethylphenyl)-2H-benzotriazole; an unsaturated monomer having UV stabilizing performance, such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine; and a carbonyl group-containing unsaturated monomer such as acrolein, diacetone acrylamide, diacetone methacrylamide, acetoacetoxyethyl methacrylate, formylstyrol and vinyl alkyl ketone having 4 to 7 carbon atoms (e.g., vinyl methyl ketone, vinyl ethyl ketone, vinyl butyl ketone). One of these may be used alone, or two or more thereof may be used in combination.

The hydroxyl group-containing acrylic resin (A) has a glass transition temperature (Tg) of from 5 to 15° C. When Tg falls within the range above, the chipping resistance can be enhanced.

In the present specification, the glass transition temperature Tg of the hydroxy group-containing acrylic resin is a value calculated in accordance with the following formula:

$$1/Tg(K) = W1/T1 + W2/T2 + \ldots Wn/Tn$$

$$Tg(° C.) = Tg(K) - 273$$

wherein W1, W2, Wn are mass fractions of respective monomers, and T1, T2 Tn are glass transition temperatures Tg (K) of homopolymers of respective monomers.

The glass transition temperature of a homopolymer of each monomer is a value from POLYMER HANDBOOK, Fourth Edition, compiled by J. Brandrup, E. H. Immergut, and E. A. Grulke (1999), and as for the glass transition temperature of a monomer not described in the document, a value obtained by synthesizing a homopolymer of the monomer to have a weight average molecular weight of about 50,000 and measuring the glass transition temperature thereof by differential scanning thermal analysis is used.

The hydroxyl group-containing acrylic resin (A) has a weight average molecular weight of from 30,000 to 40,000. When the weight average molecular weight falls within the range above, the chipping resistance can be enhanced.

Furthermore, from the standpoint of storage stability or water resistance of the coated film obtained, the hydroxyl group-containing acrylic resin (A) may have a hydroxyl value of usually from 1 to 200 mgKOH/g, preferably from 2 to 100 mgKOH/g, more preferably from 3 to 60 mgKOH/g, and an acid value of usually from 1 to 200 mgKOH/g, preferably from 2 to 150 mgKOH/g, more preferably from 5 to 100 mgKOH/g.

In the present specification, the hydroxyl value (mgKOH/g) is the number of milligrams of potassium hydroxide equivalent to the hydroxyl content of 1 gram of the sample (in the case of a resin, the sample being a solid content of the resin). The molecular weight of potassium hydroxide is 56.1.

In addition, in the present specification, the acid value (mgKOH/g) is the number of milligrams of potassium hydroxide equivalent to the acid content of 1 gram of the sample (in the case of a resin, the sample being a solid content of the resin). The molecular weight of potassium hydroxide is 56.1.

<<Polyurethane Resin (B)>>

The polyurethane resin (B) has a glass transition temperature (Tg) of −50° C. or less and has a polyether skeleton. Preferable examples of the polyurethane resin (B) include the following urethane resin emulsion (B1).

Examples of the urethane resin emulsion (B1) include a urethane resin emulsion produced from a polyisocyanate component (b1) and a polyol component (b2) in accordance with a conventional method.

Examples of the polyisocyanate component (b1) include diisocyanate and other polyisocyanates.

The diisocyanate as a raw material of the urethane resin emulsion (B1) is not particularly limited, and one kind of or a mixture of two or more kinds of diisocyanates widely used in this technical field may be used. Examples of the diisocyanate include an aromatic diisocyanate such as tolylene diisocyanate, diphenylmethane-4,4'-diisocyanate, p-phenylene diisocyanate, xylylene diisocyanate, 1,5-naphthylene diisocyanate, 3,3'-dimethyldiphenyl-4,4'-diisocyanate, dianisidine diisocyanate and tetramethylxylylene diisocyanate; an alicyclic diisocyanate such as isophorone diisocyanate, dicyclohexylmethane-4,4'-diisocyanate, trans-1,4-cyclohexyl diisocyanate and norbornene diisocyanate; and an aliphatic diisocyanate such as 1,6-hexamethylene diisocyanate, 2,2,4- and/or (2,4,4)-trimethylhexamethylene diisocyanate and lysine diisocyanate.

In a preferred embodiment, the diisocyanate above may be used in the form of a blocked isocyanate blocked with various blocking agents. The content (mass %) of diisocyanate in the polyisocyanate component (b1) is preferably from 10 to 60%, more preferably from 20 to 40%, from the standpoint of chipping resistance.

Another polyisocyanate as a raw material of the urethane resin emulsion (B1) is a polyisocyanate having three or more isocyanate group per molecule. Examples thereof include isocyanurate trimer, biuret trimer, and trimethylolpropane adduct of the above-exemplified diisocyanates; and a trifunctional or higher functional isocyanate such as triphenylmethane triisocyanate, 1-methylbenzole-2,4,6-triisocyanate and dimethyltriphenylmethane tetraisocyanate, and such an isocyanate compound may be used in the form of a modified product by carbodiimide modification, isocyanurate modification, biuret modification, etc. or may be used in the form of a blocked isocyanate blocked with various blocking agents.

Examples of the polyol component (b2) include a polyol having a polyether skeleton for imparting a polyether skeleton to the polyurethane resin (B). Examples of such a polyol include a polyoxyalkylene glycol such as polyethylene glycol, polypropylene glycol, poly(ethylene)propylene glycol and polytetramethylene glycol; and an ethylene oxide and/or propylene oxide adduct of a polyhydric alcohol. Examples of the polyhydric alcohol include aliphatic diols such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, 1,10-decanediol, diethylene glycol and triethylene glycol; alicyclic diols such as cyclohexanedimethanol and cyclohexanediol; and a trihydric or higher polyhydric alcohol such as trimethylolethane, trimethylolpropane, hexitols, pentitols, glycerin, pentaerythritol and tetramethylolpropane. When the polyurethane resin (B) has a polyether skeleton, excellent chipping resistance can be exhibited.

The ratio of the polyisocyanate component (b1) to the polyol component (b2) is not particularly limited, but in a preferred embodiment, the polyol component (b2) is used in a ratio of preferably from 40 to 90 mass %, more preferably from 50 to 80 mass %, relative to total mass of the polyisocyanate component (b1) and the polyol component (b2) used for the production of the urethane resin emulsion (B1).

In addition to the polyisocyanate component (b1) and the polyol component (b2), an amine component (b3) may be used as a raw material in order to, e.g., form a urea bond or achieve a high molecular weight. Examples of the amine component (b3) include a monoamine compound and a diamine compound.

The monoamine compound is not particularly limited, and one kind of or a mixture of two or more kinds of monoamine compounds widely used in this technical filed can be used. Examples of the monoamine compound include an alkylamine such as ethylamine, propylamine, 2-propylamine, butylamine, 2-butylamine, tertiary-butylamine and isobutylamine; an aromatic amine such as aniline, methylaniline, phenylnaphthylamine and naphthylamine; an alicyclic amine such as cyclohexaneamine and methylcyclohexaneamine; an ether amine such as 2-methoxyethylamine, 3-methoxypropylamine and 2-(2-methoxyethoxy)ethylamine; and an alkanolamine such as ethanolamine, propanolamine, butylethanolamine, 1-amino-2-methyl-2-propanol, 2-amino-2-methylpropanol, diethanolamine, diisopropanolamine, dimethylaminopropylethanolamine, dipropanolamine, N-methylethanolamine and N-ethylethanolamine. Among these, an alkanolamine imparts good water dispersion stability to a polyurethane molecule and is preferred, and 2-aminoethanol and diethanolamine are more preferred because of low cost.

The diamine compound is not particularly limited, and one kind of or a mixture of two or more kinds of diamine compounds widely used in this technical field can be used. Examples of the diamine compound include low molecular diamines obtained by substituting an alcoholic hydroxyl group of the above-exemplified low molecular diols with an amino group, such as ethylenediamine and propylenediamine; polyether diamines such as polyoxypropylene diamine and polyoxyethylene diamine; alicyclic diamines such as menthenediamine, isophoronediamine, norbornenediamine, bis(4-amino-3-methyldicyclohexyl)methane, diaminodicyclohexylmethane, bis(aminomethyl)cyclohexane and 3,9-bis(3-aminopropyl)2,4,8,10-tetraoxaspiro(5, 5)undecane; aromatic diamines such as m-xylenediamine, α-(m/p aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine and α,α'-bis(4-aminophenyl)-p-diisopropylbenzene; hydrazine; and a dicarboxylic acid dihydrazide compound that is a compound between a dicarboxylic acid exemplified by a polyvalent carboxylic acid used for the above-described polyester polyol, and hydrazine. Among these diamine compounds, the low molecular weight diamines are preferred because of low cost, and ethylenediamine is more preferred.

In the urethane resin emulsion (B1), an internal branching agent and an internal crosslinking agent capable of providing a branch and a crosslinked structure to a polyurethane molecule may be used, in addition to the components (b1) to (b3). As the internal branching agent and internal crosslinking agent, examples thereof include trimethylolpropane.

The method of producing the polyurethane resin emulsion (B1) is not particularly limited, and a method widely used in this technical field can be adopted. Preferable production method include a method of synthesizing a prepolymer or a polymer in a solvent that is inert to the reaction and has high affinity for water, and feeding and dispersing it into water. Examples thereof include (i) a method of synthesizing a prepolymer from the polyisocyanate component (b1) and the polyol component (b2) in the solvent above, and reacting it in water with the amine component (b3) that is used, if desired; and (ii) a method of synthesizing a polymer from the polyisocyanate component (b1), the polyol component (b2), and the amine component (b3) that is used, if desired, and feeding and dispersing it into water. In addition, a neutralizer component may be previously added to water into which the prepolymer or polymer is fed, or may be added after feeding.

As the solvent being inert to the reaction and having high affinity for water, which is used in the above-described suitable production method, examples thereof include acetone, methyl ethyl ketone, dioxane, tetrahydrofuran, and N-methyl-2-pyrrolidone. Such a solvent is usually used in a ratio of 3 to 100 mass % relative to the total amount of those raw materials used for the production of prepolymer.

In the production method above, the blending ratio is not particularly limited. The blending ratio can be replaced by the molar ratio in a reaction stage between an isocyanate group in the polyisocyanate component (b1) and an isocyanate reactive group in the polyol component (b2) and the amine component (b3) that is used, if desired. As for the molar ratio, if an unreacted isocyanate group is lack in dispersed polyurethane molecules, adhesiveness of the coated film and/or strength of the coated film may be reduced when the polyurethane resin is used for a coating composition, and if an unreacted isocyanate group is present in an excessive amount, it may affect dispersion stability and/or physical properties of the coating composition. For this reason, the molar ratio of an isocyanate reactive group is preferably from 0.5 to 2.0 when assuming an isocyanate group is 1. Furthermore, the molar ratio of an isocyanate reactive group in the polyol component (b2) is preferably from 0.3 to 1.0, more preferably from 0.5 to 0.9, when assuming an isocyanate group in the polyisocyanate component (b1) is 1. The molar ratio of an isocyanate reactive group in the amine component (b3) that is used, if desired, is preferably from 0.1 to 1.0, more preferably from 0.2 to 0.5, when assuming an isocyanate group in the polyisocyanate component (b1) is 1.

In order to stabilize the dispersibility of the urethane resin emulsion (B1), one kind of or two or more kinds of emulsifiers such as surfactant may be used. The particle diameter thereof is not particularly limited but is preferably 1 μm or less, more preferably 500 nm or less, still more preferably 10 to 500 nm, because good dispersion state can be maintained.

As the emulsifier, an anionic surfactant, a nonionic surfactant, a cationic surfactant, an amphoteric surfactant, a high molecular surfactant, a reactive surfactant, etc., which are widely used in this technical field and used in a urethane resin emulsion, may be used. In the case of using the emulsifier, for the reason that the cost is low and good emulsification is obtained, an anionic surfactant, a nonionic surfactant and a cationic surfactant are preferred.

Examples of the anionic surfactant include alkyl sulfates such as sodium dodecyl sulfate, potassium dodecyl sulfate and ammonium dodecyl sulfate; sodium dodecyl polyglycol ether sulfate; sodium sulforicinoleate; an alkyl sulfonate such as alkali metal salt of sulfonated paraffin and ammonium salt of sulfonated paraffin; a fatty acid salt such as sodium laurate, triethanolamine oleate and triethanolamine abietate; an alkylaryl sulfonate such as sodium benzene sulfonate and alkali metal sulfate of alkali phenol hydroxyethylene; a higher alkylnaphthalenesulfonate; a naphthalenesulfonic acid-formalin condensate; a dialkylsulfosuccinate; a polyoxyethylene alkyl sulfate; and a polyoxyethylene alkylaryl sulfate.

Examples of the nonionic surfactant include an ethylene oxide and/or propylene oxide adduct of an alcohol having a carbon number of 1 to 18, an ethylene oxide and/or propylene oxide adduct of an alkylphenol, and an ethylene oxide and/or propylene oxide adduct of an alkylene glycol and/or an alkylene diamine.

As the alcohol having a carbon number of 1 to 18 constituting the nonionic surfactant, examples thereof include methanol, ethanol, propanol, 2-propanol, butanol, 2-butanol, tertiary-butanol, amyl alcohol, isoamyl alcohol, tertiary-amyl alcohol, hexanol, octanol, decane alcohol, lauryl alcohol, myristyl alcohol, palmityl alcohol, and stearyl alcohol. Examples of the alkylphenols include phenol, methylphenol, 2,4-di-tertiary-butylphenol, 2,5-di-tertiary-butylphenol, 3,5-di-tertiary-butylphenol, 4-(1,3-tetramethylbutyl) phenol, 4-isooctylphenol, 4-nonylphenol, 4-tertiary-octylphenol, 4-dodecylphenol, 2-(3,5-dimethylheptyl) phenol, 4-(3,5-dimethylheptyl)phenol, naphthol, bisphenol A, and bisphenol F. Examples of the alkylene glycol include ethylene glycol, 1,2-propanediol, 1,3-propanediol, 2-methyl-1,3-propanediol, 2-butyl-2-ethyl-1,3-propanediol, 1,4-butanediol, neopentyl glycol, 1,5-pentanediol, 3-methyl-1,5-pentanediol, 2,4-diethyl-1,5-pentanediol, and 1,6-hexanediol. Examples of the alkylene diamine include these alkylene glycols in which an alcoholic hydroxy group is substituted with an amino group. The ethylene oxide and propylene oxide adducts may be a random adduct or a block adduct.

Examples of the cationic surfactant include primary to tertiary amine salts, a pyridinium salt, an alkyl pyridinium salt, and a quaternary ammonium salt such as alkyl halide quaternary ammonium salt.

In the case of using such an emulsifier, the amount thereof is not particularly limited, and the emulsifier may be used in any amount, but when the amount used is 0.01 or more in terms of mass ratio when assuming the urethane resin is 1, sufficient dispersibility is obtained, and when the molar ratio is 0.3 or less when assuming the urethane resin is 1, reduction in the physical properties such as water resistance, strength and elongation of the coated film, etc. obtained from the aqueous intermediate coating composition can be suppressed. For this reason, the molar ratio is preferably from 0.01 to 0.3, more preferably from 0.05 to 0.2, when assuming the urethane resin is 1.

As the urethane resin emulsion (B1), a commercial product can be used. Examples of the commercial product include "Bayhydrol" series produced by Covestro; "Superflex" series produced by Dai-Ichi Kogyo Seiyaku Co., Ltd.); and "PERMARIN" series and "UCOAT" series produced by Sanyo Chemical Industries, Ltd.

In the urethane resin emulsion (B1), the solid content thereof is not particularly limited, and any value can be selected. The solid content is preferably from 10 to 50 mass % because of good dispersibility and coating performance, and more preferably from 20 to 40 mass %.

The average molecular weight of the urethane resin dispersed in the urethane resin emulsion (B1) is not particularly limited, and any range in which dispersibility as an aqueous coating composition is imparted and a good coated film is formed, may be selected. The weight average molecular weight is preferably from 1,000 to 500,000, more preferably from 5,000 to 200,000. The hydroxyl value is also not particularly limited, and any value can be selected. The acid value is expressed in consumption (mg) of KOH per gram of resin and is usually from 0 to 100 mgKOH/g.

The glass transition temperature (Tg) of the urethane resin dispersed in the urethane resin emulsion (B1) is −50° C. or less. When Tg falls within this range, the chipping resistance can be enhanced. Tg is preferably from −80 to −50° C., more preferably from −75 to −50° C.

In the present invention, the glass transition temperature (Tg) of the urethane resin above is a value measured using a dynamic viscoelasticity measuring apparatus and can be a value in the catalogue of the raw material manufacturer.

<<Hydroxyl Group-Containing Polyester Resin (C)>>

The hydroxyl group-containing polyester resin (C) can be synthesized by a known method of subjecting a polybasic acid and a polyhydric alcohol to an esterification reaction in an usual manner.

The hydroxyl group-containing polyester resin (C) preferably has an acid group such as carboxyl group.

The polybasic acid is a compound having two or more carboxyl groups per molecule and examples thereof include phthalic acid, isophthalic acid, terephthalic acid, succinic acid, adipic acid, azelaic acid, sebacic acid, naphthalenedicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methylhexahydrophthalic acid, and anhydrides thereof.

The polyhydric alcohol is a compound having two or more hydroxyl groups per molecule and examples thereof include glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol and hydroxypivalic acid-neopentyl glycol ester; a polylactonediol formed by adding lactones such as ε-caprolactone to the glycols above; polyester diols such as bis(hydroxyethyl) terephthalate; 1,3-cyclohexanedimethanol; 1,4-cyclohexanedimethanol; tricyclodecanedimethanol; hydrogenated bisphenol A; hydrogenated bisphenol F; spiroglycol; dihydroxymethyltricyclodecane; glycerin; trimethylolpropane; trimethylolethane; diglycerin; triglycerin; 1,2,6-hexanetriol; pentaerythritol; dipentaerythritol; dipentaerythritol; sorbitol; mannitol; and a hydroxycarboxylic acid such as 2,2-dimethylolpropionic acid, 2,2-dimethylolbutanoic acid, 2,2-dimethylolpentanoic acid, 2,2-dimethylolhexanoic acid and 2,2-dimethylolotanoic acid.

As the hydroxyl group-containing polyester resin (C), a fatty acid-modified polyester resin modified with, e.g., a (semi)drying oil fatty acid such as linseed oil fatty acid, coconut oil fatty acid, safflower oil fatty acid, soybean oil fatty acid, sesame oil fatty acid, perilla oil fatty acid, hempseed oil fatty acid, tall oil fatty acid and dehydrated castor oil fatty acid, may also be used. In general, the modification amount with such a fatty acid is suitably 30 mass % or less in terms of oil length. In addition, the hydroxyl group-containing polyester resin (C) may be a resin in which a part of a monobasic acid such as benzoic acid is reacted.

The hydroxyl group-containing polyester resin (C) may also be a resin in which an α-olefin epoxide such as propylene oxide or butylene oxide, a monoepoxy compound such as CARDURA E10 (produced by Momentive Specialty Chemicals Inc., trade name, a glycidyl ester of a synthetic hyperbranched saturated fatty acid), etc. is reacted with an acid group in the polyester resin.

In the case of introducing a carboxyl group into the polyester resin, the carboxyl group may be introduced, for example, by adding an acid anhydride to a hydroxyl group-containing polyester to cause half-esterification.

The hydroxyl value of the hydroxyl group-containing polyester resin (C) is preferably from 10 mg KOH/g to 250 mg KOH/g, particularly preferably from 40 mg KOH/g to 170 mg KOH/g, from the viewpoint of finish appearance and curability of the coated film.

In the case where the hydroxyl group-containing polyester resin (C) has an acid group, the acid value is preferably from 1 mg KOH/g to 100 mg KOH/g, particularly preferably from 5 mg KOH/g to 60 mg KOH/g, from the viewpoint of curability and adhesion of the coated film.

The number average molecular weight of the hydroxyl group-containing polyester resin (C) is preferably from 1,000 to 50,000, particularly preferably from 1,000 to 10,000, from the viewpoint of curability and finish appearance of the coated film. Here, the number average molecular weight of the hydroxyl group-containing polyester resin (C) is determined by gel permeation chromatograph (GPC).

<<Melamine Resin (D)>>

In an aspect of the present invention, a melamine resin (D) is contained as an aqueous crosslinking agent component of the intermediate coating composition (X).

As the melamine resin, examples thereof include a partially methylolated melamine resin or a fully methylolated melamine resin, obtained by the reaction of a melamine component and an aldehyde component. Examples of the aldehyde component include formaldehyde, paraformaldehyde, acetaldehyde, benzaldehyde, etc.

In addition, a methylolated melamine resin in which the methylol group is etherified in part or in whole with an appropriate alcohol may also be used. Examples of the alcohol to be used for the etherification include methyl alcohol, ethyl alcohol, n-propyl alcohol, isopropyl alcohol, n-butyl alcohol, isobutyl alcohol, 2-ethyl-1-butanol, and 2-ethyl-1-hexanol.

The melamine resin is preferably a methyl-etherified melamine resin obtained by etherifying, in part or in whole, the methylol group of a partially or fully methylolated melamine resin with methyl alcohol, a butyl-etherified melamine resin obtained by etherifying, in part or in whole, the methylol group of a partially or fully methylolated melamine resin with butyl alcohol, or a methyl-butyl mixture-etherified melamine resin obtained by etherifying, in part or in whole, the methylol group of a partially or fully methylolated melamine resin with methyl alcohol and butyl alcohol, more preferably a methyl-butyl mixture-etherified melamine resin.

The weight average molecular weight of the melamine resin is preferably from 400 to 6,000, more preferably from 500 to 4,000, still more preferably from 600 to 3,000.

A commercially available melamine resin can be used as the melamine resin. As the trade name of the commercially available melamine resin, examples thereof include "CYMEL 202" "CYMEL 203" "CYMEL 204" "CYMEL 211" "CYMEL 212", "CYMEL 238" "CYMEL 251" "CYMEL 253" "CYMEL 254" "CYMEL 303", "CYMEL 323" "CYMEL 324" "CYMEL 325" "CYMEL 327" "CYMEL 350", "CYMEL 370", "CYMEL 380", "CYMEL 385", "CYMEL 1156", "CYMEL 1158", "CYMEL 1116", and "CYMEL 1130" (trade names, all produced by Allnex Japan Inc.); "RESIMENE 735", "RESIMENE 740", "RESIMENE 741", "RESIMENE 745", "RESIMENE 746", and "RESIMENE 747" (trade names, all produced by Monsanto Co., Ltd.); "U-VAN 120", "U-VAN 20HS", "U-VAN 20SE", "U-VAN 2021", "U-VAN 2028", and "U-VAN 28-60" (trade names, all produced by Mitsui Chemicals, Inc.); and "SUMIMAL M55", "SUMIMAL M30W", and "SUMIMAL M50W" (trade names, all produced by Sumitomo Chemical Co., Ltd.).

<<Active Methylene-Blocked Polyisocyanate Compound (E)>>

Examples of the active methylene-blocked polyisocyanate compound (E) include a blocked polyisocyanate compound obtained by reacting an active methylene compound with an isocyanate group in a polyisocyanate compound. In the present invention, an active methylene-blocked polyisocyanate compound (E1) having a hydrophilic group is particularly preferred. As the compound (E1), a blocked polyisocyanate compound (e3) obtained by reacting an active hydrogen-containing compound having a hydrophilic group with a part of isocyanate groups in a polyisocyanate compound (e1) to introduce the hydrophilic group, and further reacting an active methylene compound (e2) with an isocyanate group in the polyisocyanate compound (e1) can be suitably used. Furthermore, a compound obtained by reacting a secondary alcohol (e4) having a carbon number of 6 or more with the blocked polyisocyanate compound (e3) can be suitably used.

The polyisocyanate compound (e1) has at least two isocyanate groups per molecule and examples thereof include an aliphatic polyisocyanate, an alicyclic polyisocyanate, an aromatic-aliphatic polyisocyanate, an aromatic polyisocyanate, and a derivatives of these polyisocyanate.

Examples of the aliphatic polyisocyanate include an aliphatic diisocyanate such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate and methyl 2,6-diisocyanatohexanoate (common name: lysine diisocyanate); and an aliphatic triisocyanate such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of the alicyclic polyisocyanate include an alicyclic diisocyanate such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or a mixture thereof, methylenebis(4,1-cyclohexanediyl) diisocyanate (common name: hydrogenated MDI) and norbornane diisocyanate; and an alicyclic triisocyanate such as 1,3,5-triisocyanatocyclohexane, 1,3,5-trimethylisocyanatocyclohexane, 2-(3-isocynatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1) heptane.

Examples of the aromatic-aliphatic polyisocyanate include an aromatic-aliphatic diisocyanate such as methylenebis(4,1-phenylene)diisocyanate (common name: MDI), 1,3- or 1,4-xylylene diisocyanate or a mixture thereof, ω,ω'-diisocyanato-1,4-diethylbenzene, and 1,3- or 1,4-bis(1-isocyanato-1-methylethyl)benzene (common name: tetramethylxylylene diisocyanate) or a mixture thereof; and an aromatic-aliphatic triisocyanate such as 1,3,5-triisocyanatomethylbenzene.

Examples of the aromatic polyisocyanate include an aromatic diisocyanate such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI) or a mixture thereof, 4,4'-toluidine diisocyanate and 4,4'-diphenylether diisocyanate; an aromatic triisocyanate such as triphenylmethane-4,4',4"-triisocyanate, 1,3,5-triisocyanatobenzene and 2,4,6-triisocyanatotoluene; and an aromatic tetraisocyanate such as 4,4'-diphenylmethane-2,2',5,5'-tetraisocyanate.

Examples of the derivative of the polyisocyanate include a dimer, a trimer, a biuret, an allophanate, a urethodione, a urethoimine, an isocyanurate, an oxadiazinetrione, a polymethylene polyphenyl polyisocyanate (crude MDI; polymeric MDI), and a crude TDI, of the above-described polyisocyanate.

One of the above-described polyisocyanates and derivatives thereof may be used alone, or two or more thereof may be used in combination. Among these polyisocyanates, an aliphatic diisocyanate, an alicyclic diisocyanate, and a derivative thereof are preferred as the polyisocyanate compound (e1), because yellowing is less likely to occur during heating of the obtained blocked polyisocyanate compound (e1). Above all, from the viewpoint of improving flexibility of the formed coated film, an aliphatic diisocyanate and a derivative thereof are more preferred.

As the active hydrogen-containing compound having a hydrophilic group, examples thereof include an active hydrogen-containing compound having a nonionic hydrophilic group, an active hydrogen-containing compound having an anionic hydrophilic group, and an active hydrogen-containing compound having a cationic hydrophilic group, and one of these may be used alone, or two or more thereof may be used in combination. Among these, an active hydrogen-containing compound having a nonionic hydrophilic group is preferably used, because the reaction of blocking an isocyanate group in the polyisocyanate compound (e1) by the active methylene compound (e2) is less likely to be inhibited.

As the active hydrogen-containing compound having a nonionic hydrophilic group, for example, an active hydrogen-containing compound having a polyoxyalkylene group can be suitably used. Examples of the polyoxyalkylene group include a polyoxyethylene group and a polyoxypropylene group, and one of these may be used alone, or two or more thereof may be used in combination. Among these, from the standpoint of storage stability of the coating composition, an active hydrogen-containing compound having a polyoxyethylene group is preferred.

From the viewpoint of, e.g., storage stability of the coating composition and adhesion of the formed multilayer coated film, the active hydrogen-containing compound having a polyoxyethylene group suitably contains usually 3 or more, preferably from 5 to 100, more preferably from 8 to 45, continuous oxyethylene groups.

The active hydrogen-containing compound having a polyoxyethylene group may contain an oxyalkylene group except for an oxyethylene group, in addition to the continuous oxyethylene groups. As the oxyalkylene group except for the oxyethylene group, examples thereof include an oxypropylene group, an oxybutylene group, and an oxystyrene group. In the active hydrogen-containing compound having a polyoxyethylene group, from the standpoint of storage stability of the coating composition, the molar ratio of the oxyethylene group in the oxyalkylene group is preferably from 20 to 100 mol %, more preferably from 50 to 100 mol %. When the molar ratio of the oxyethylene group in the oxyalkylene group is 20 mol % or more, sufficient hydrophilicity can be imparted and therefore, reduction in the storage stability of the coating composition can be suppressed.

In the active hydrogen-containing compound having a nonionic hydrophilic group, from the standpoint of storage stability of the coating composition and water resistance of the formed multilayer coated film, the number average molecular weight is preferably from 200 to 2,000. From the standpoint of storage stability of the coating composition, the lower limit of the number average molecular weight is preferably 300, more preferably 400. From the standpoint of water resistance of the formed multilayer coated film, the upper limit is preferably 1,500, more preferably 1,200.

As the active hydrogen-containing compound having a nonionic hydrophilic group, examples thereof include a polyethylene glycol monoalkyl ether (another name: ω-alkoxy polyoxyethylene) such as polyethylene glycol monomethyl ether and polyethylene glycol monoethyl ether; a polypropylene glycol monoalkyl ether (another name: ω-alkoxy polyoxypropylene) such as polypropylene glycol monomethyl ether and polypropylene glycol monoethyl ether; an ω-alkoxy polyoxyethylene (oxypropylene) such as ω-methoxy polyoxyethylene (oxypropylene) and ω-ethoxy polyoxyethylene (oxypropylene); a polyethylene glycol (propylene glycol) monoalkyl ether such as polyethylene glycol (propylene glycol) monomethyl ether and polyethylene glycol (propylene glycol) monoethyl ether; and polyethylene glycol, polypropylene glycol, polyethylene glycol (propylene glycol), α-(aminoalkyl)-ω-alkoxypolyoxyethylene, α-(aminoalkyl)-ω-alkoxypolyoxypropylene, and α-(aminoalkyl)-ω-alkoxypolyoxyethylene (oxypropylene), and one of these may be used alone, or two or more thereof may be used in combination. Among these, polyethylene glycol monomethyl ether, polyethylene glycol monoethyl ether, and polyethylene glycol are preferred, and polyethylene glycol monomethyl ether is more preferred.

As the commercial product of the polyethylene glycol monomethyl ether, examples thereof include "Uniox M-400", "Uniox M-550", "Uniox M-1000", and "Uniox M-2000", all produced by NOF Corporation. Examples of the commercial product of the polyethylene glycol include "PEG #200", "PEG #300", "PEG #400", "PEG #600", "PEG #1000", "PEG #1500", "PEG #1540", and "PEG #2000", all produced by NOF Corporation.

The reaction of a part of isocyanate groups in the polyisocyanate compound (e1) with the active hydrogen-containing compound having a hydrophilic group can be performed at 0 to 150° C., and a solvent may be used. In this case, the solvent is preferably an aprotic solvent and is particularly preferably an ester, an ether, an N-alkylamide, a ketone, etc. The active hydrogen-containing compound which has not reacted with an isocyanate group in the polyisocyanate compound (e1) can be removed after the completion of reaction. As for the reaction ratio of the polyisocyanate compound (e1) and the active hydrogen-containing compound having a hydrophilic group, from the standpoint of storage stability and curability of the coating composition and smoothness, clearness and adhesion of the formed multilayer coated film, the number of moles of the active hydrogen in the active hydrogen-containing compound is preferably from 0.03 to 0.6 mol, more preferably from 0.04 to 0.4 mol, per mol of the isocyanate group in the polyisocyanate compound (e1).

Examples of the active methylene compound (e2) include a malonic acid diester such as dimethyl malonate, diethyl malonate, di-n-propyl malonate, diisopropyl malonate, di-n-butyl malonate, diisobutyl malonate, di-sec-butyl malonate, di-tert-butyl malonate, di-n-pentyl malonate, di-n-hexyl malonate, di(2-ethylhexyl) malonate, methyl isopropyl malonate, ethyl isopropyl malonate, methyl n-butyl malonate, ethyl n-butyl malonate, methyl isobutyl malonate, ethyl isobutyl malonate, methyl sec-butyl malonate, ethyl sec-butyl malonate, diphenyl malonate and dibenzyl malonate; an acetoacetic acid ester such as methyl acetoacetate, ethyl acetoacetate, n-propyl acetoacetate, isopropyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate and benzyl acetoacetate; and an isobutyrylacetic acid ester such as methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate and benzyl isobutyrylacetate. One of these may be used alone, or two or more thereof may be used in combination.

From the standpoint of smoothness and clearness of the formed multilayer coated film, the active methylene compound (e2) is preferably at least one compound selected from the group consisting of dimethyl malonate, diethyl malonate, diisopropyl malonate, methyl acetoacetate, ethyl acetoacetate, methyl isobutyrylacetate and ethyl isobutyrylacetate, and more preferably at least one compound selected from the group consisting of diisopropyl malonate, methyl isobutyrylacetate and ethyl isobutyrylacetate. Among these, from the standpoint of smoothness and clearness of the formed multilayer coated film as well as reactivity of the obtained blocked polyisocyanate compound (e1) and storage stability of the coating composition, the compound is still more preferably diisopropyl malonate.

In the reaction of blocking an isocyanate group by the active methylene compound (e2), a reaction catalyst may be used, if desired. Examples of the reaction catalyst include a basic compound such as metal hydroxide, metal alkoxide, metal carboxylate, metal acetylacetonate, hydroxide of an onium salt, onium carboxylate, metal salt of an active methylene compound, onium salt of an active methylene compound, aminosilanes, amines and phosphines. As the onium salt, an ammonium salt, a phosphonium salt, and a sulfonium salt are suitable. The amount of the reaction catalyst used is preferably from 10 to 10,000 ppm, more preferably from 20 to 5,000 ppm, based on the total solid mass of the polyisocyanate compound (e1) and the active methylene compound (e2).

The reaction of blocking an isocyanate group by the active methylene compound (e2) can be performed at 0 to 150° C., and a solvent may be used. In this case, the solvent is preferably an aprotic solvent, more preferably an ester, an ether, an N-alkylamide, a ketone, etc. When the reaction proceeds as intended, the reaction may be terminated by adding an acid component to neutralize the basic compound as a catalyst.

In the reaction of blocking an isocyanate group by the active methylene compound (e2), the amount of the active methylene compound (e2) used is not particularly limited but is suitably, usually from 0.1 to 3 mol, preferably from 0.2 to 2 mol, per mol of the isocyanate group in the polyisocyanate compound (e1). The active methylene compound which has not been reacted with an isocyanate group in the polyisocyanate compound (e1) can be removed after the completion of blocking reaction.

Other than the active methylene compound (e2), a blocking agent such as alcohol-based blocking agents, phenol-based blocking agents, oxime-based blocking agents, amine-based blocking agents, acid amide-based blocking agents, imidazole-based blocking agents, pyridine-based blocking agents and mercaptan-based blocking agents may be used in combination.

As described above, an isocyanate group in the polyisocyanate compound (e1) is reacted with the active methylene compound (e2) to obtain a blocked polyisocyanate compound (e3). The blocked polyisocyanate compound (e3) may be further reacted with a secondary alcohol (e4) having a carbon number of 6 or more.

As the secondary alcohol (e4) having a carbon number of 6 or more, examples thereof include 4-methyl-2-pentanol, 5-methyl-2-hexanol, 6-methyl-2-heptanol, and 7-methyl-2-octanol. One of these may be used alone, or two or more thereof may be used in combination.

The reaction of the blocked polyisocyanate compound (e3) and the secondary alcohol (e4) is preferably performed by a method of removing a part or all of the alcohol derived from active methylene in the blocked polyisocyanate compound (e3) by distillation from the system under heating, reduced pressure, etc., and promoting the reaction.

As the production method above, specifically, it is suitable to remove a part or all of the alcohol at a temperature of usually from 20 to 150° C., preferably from 75 to 95° C., over 5 minutes to 20 hours, preferably over 10 minutes to 10 hours, by reducing the pressure, if desired.

As for the blending ratio of the blocked polyisocyanate compound (e3) and the secondary alcohol (e4), the ratio of the secondary alcohol (e4) is preferably from 5 to 500 parts by mass, more preferably from 10 to 200 parts by mass, based on 100 parts by mass of the solid content of the blocked polyisocyanate compound (e3).

In the reaction of the blocked polyisocyanate compound (e3) and the secondary alcohol (e4), in order to control the molecular weight of the blocked polyisocyanate compound (e1), the above-described removing operation may be performed after adding a polyfunctional hydroxy group-containing compound to the blocked polyisocyanate compound (e3) and the secondary alcohol (e4).

From the standpoint of compatibility with other components of the coating composition and smoothness, clearness, water resistance, chipping resistance, etc. of the formed multilayer coated film, the number average molecular weight of the blocked polyisocyanate compound (e1) obtained as above is preferably from 600 to 30,000, more preferably from 900 to 10,000.

In the aqueous intermediate coating composition (X), the ratio of the hydroxyl group-containing acrylic resin (A) to the polyurethane resin (B) (i.e. (former/latter)) is from 20/10 to 30/10 in terms of solid content ratio. If the ratio of the hydroxyl group-containing acrylic resin (A) is less than the lower limit above, the chipping resistance and the adhesion to a glass member may be deteriorated, whereas if it exceeds the upper limit above, the chipping resistance may deteriorate.

In the aqueous intermediate coating composition (X), from the viewpoint of enhancing the chipping resistance and the adhesion strength for bonding of a member, the ratio of the components (A), (B), (C), (D) and (E) (solid contents) is preferably in the following ranges based on 100 parts by mass of the resin solid content in the aqueous intermediate coating composition (X):

hydroxyl group-containing acrylic resin (A): usually from 5 to 30 parts by mass, preferably from 10 to 30 parts by mass, more preferably from 20 to 30 parts by mass;

polyurethane resin (B): usually from 5 to 20 parts by mass, preferably from 5 to 15 parts by mass, more preferably from 8 to 12 parts by mass;

hydroxyl group-containing polyester resin (C): usually from 10 to 40 parts by mass, preferably from 15 to 35 parts by mass, more preferably from 20 to 30 parts by mass;

melamine resin (D): usually from 10 to 40 parts by mass, preferably from 15 to 35 parts by mass, more preferably from 20 to 30 parts by mass; and active methylene-blocked polyisocyanate compound (E): usually from 5 to 25 parts by mass, preferably from 5 to 15 parts by mass, more preferably from 8 to 12 parts by mass.

<<Pigment (F)>>

As the pigment (F), a pigment usually employed for a coating composition may be used. Specifically, a color pigment such as titanium dioxide, zinc white, carbon black, phthalocyanine blue, Prussian blue, cobalt blue, azo pigment, phthalocyanine pigment, quinacridone pigment, isoindoline pigment, threne pigment and perylene pigment; an extender pigment such as clay, kaolin, baryta, barium sulfate, barium carbonate, calcium carbonate, silica, alumina white and talc; an effect pigment such as aluminum flake and mica flake; etc. may be suitably used.

In the aqueous intermediate coating composition (X), the pigment may be blended as a powder in the coating composition, or after the pigment is mixed and dispersed with a part of the resin component to prepare a pigment dispersion in advance, the pigment dispersion may be mixed together with the remaining resin component or other components to form a coating composition. In preparing the pigment dispersion, conventional coating composition additives such as antifoaming agent, dispersant and surface regulator may be used, if desired. From the standpoint of dispersibility, the pigment above is preferably used as a powder having an average particle diameter of 0.01 μm to 6 μm.

As for the content of the pigment (F), from the viewpoint of satisfying both the chipping resistance and the adhesive strength when bonding to a member, PWC (Pigment Weight Content) is preferably from 40% to 60%, more preferably from 45% to 55%.

<<Organic Solvent (G)>>

Examples of the organic solvent (G) include a hydrocarbon-based solvent such as hexane, heptane, xylene and toluene; esters such as ethyl acetate and butyl acetate; an ether-based solvent such as ethylene glycol monomethyl ether; an alcohol-based solvent such as ethanol, propanol and 2-ethylhexyl alcohol; a ketone-based solvent such as methyl ethyl ketone and methyl isobutyl ketone; an aromatic hydrocarbon-based solvent such as SWASOL 310 and SWASOL 1000 (produced by Cosmo Oil Co., Ltd.); an aliphatic hydrocarbon-based solvent; an alicyclic hydrocarbon-based solvent; and an amide-based solvent. One of these organic solvents may be used alone, or two or more thereof may be used in combination.

In the aqueous intermediate coating composition (X), the content of the organic solvent (G) is usually from 20 mass % to 50 mass %, preferably on the order of 25 mass % to 40 mass %.

In the aqueous intermediate coating composition (X), a curing catalyst may be used from the viewpoint of enhancing the curability. As the curing catalyst, a sulfonic acid such as paratoluenesulfonic acid, dodecylbenzenesulfonic acid and dinonylnaphthalenesulfonic acid; a neutralized salt of the sulfonic acid with amine; a neutralized salt of a phosphoric acid ester compound with amine; etc., may be used.

Specific examples of the curing catalyst include an organic metal catalyst such as tin octylate, dibutyltin di(2-ethylhexanoate), dioctyltin di(2-ethylhexanoate), dioctyltin diacetate, dibutyltin dilaurate, dibutyltin oxide, dioctyltin oxide, zinc 2-ethylhexanoate and zinc octylate; and a tertiary amine.

Furthermore, in the aqueous intermediate coating composition (X), various additives such as pigment dispersant, antifoaming agent, antioxidant, ultraviolet absorber, light stabilizer, surface regulator and gloss control agent may be appropriately blended, if desired.

The aqueous intermediate coating composition (X) can be prepared by mixing and dispersing the above-described components. The solids content during coating is preferably adjusted to a range of preferably 45 mass % to 75 mass %, particularly preferably from 50 mass % to 70 mass %.

The aqueous intermediate coating composition (X) may be adjusted to a viscosity appropriate for the coating by adding an organic solvent and then applied and coated, if desired, by a conventional method such as rotary atomization coating, air spray or airless spray. From the viewpoint of smoothness, finish, etc. of the coated film, the coating composition may be applied to have a film thickness of usually 10 μm to 40 μm, preferably from 25 μm to 40 μm, based on the cured coated film.

The aqueous intermediate coated film obtained by applying the intermediate coating composition (X) can be cured per se, in the case of a baking drying, usually at a temperature of about 120° C. to about 180° C.

In the method for forming the multilayer coated film in an aspect of the present invention, the cured intermediated coated film after heat-curing the coated film (intermediate coated film) formed by the aqueous intermediate coating composition (X) must have an elongation at break at 20° C. of 20% to 30%, a Young's modulus of 5,000 MPa to 6,000 MPa, and a Tukon hardness of 4 to 6. When the elongation at break, Young's modulus and Tukon hardness fall within the ranges above, both the chipping resistance and the adhesion to glass member can be satisfied.

The physical values above are physical values of a cured coated film cured under the heating conditions that the thickness of the intermediate coated film is 50 μm and the coated film is kept at 140° C. for 18 minutes.

The elongation at break and the Young's modulus are values obtained from applying the aqueous intermediate coating composition (X) onto a glass plate to have a film thickness of 50 μm based on the cured coated film, curing the coated film by heating under the conditions of keeping it at 140° C. for 18 minutes, then separating the coated film from the glass plate, cutting the coated film into a strip shape of 20 mm in length and 5 mm in width, and measuring the strip at a tensile speed of 4 mm/min in the longitudinal direction at 20° C. by means of "TENSILON UTM-II-20" (trade name, manufactured by Orientec Inc.).

The elongation at break is the ratio of an increment of length when the film is broken, to the original length before test. The Young's modulus is the rising edge slope of a stress-strain curve.

The Tukon hardness is the value measured using TUKON (manufactured by American Chain & Cable Company, micro hardness tester) after a test coated plate prepared by applying the aqueous intermediate coating composition (X) onto an electrodeposited plate to have a film thickness of 30 μm based on the cured coated film and curing the coated film by heating under the conditions of keeping the coated film at 140° C. for 18 minutes is allowed to stand in a constant-temperature room at 20° C. for 4 hours.

For adjusting the above-described elongation at break, there is, for example, a method of adjusting the weight average molecular weight of the hydroxyl group-containing acrylic resin (A) or adjusting the ratio of the hydroxyl group-containing acrylic resin (A) to the polyurethane resin (B).

For adjusting the above-described Young's modulus, there is, for example, a method of adjusting the weight average molecular weight of the hydroxyl group-containing acrylic resin (A) or adjusting the ratio of the hydroxyl group-containing acrylic resin (A) to the polyurethane resin (B).

For adjusting the above-described Tukon hardness, there is, for example, a method of adjusting the glass transition temperature (Tg) of the hydroxyl group-containing acrylic resin (A).

<Step (2)>

According to the method of the present invention, after preheating the intermediate coated film formed in step (1), an aqueous base coating composition (Y) is applied to the intermediate coated film to form a base coated film. The aqueous base coating composition (Y) is a coating composition for imparting a design property to the multilayer coated film formed by the present invention and enhancing the design property and depth feeling by lamination with the intermediate coated film.

The preheating temperature is preferably from 40 to 100° C., more preferably from 50 to 90° C., still more preferably from 60 to 80° C. The preheating time is preferably from 30 seconds to 15 minutes, more preferably from 1 to 10 minutes, still more preferably from 2 to 5 minutes.

Before applying the aqueous base coating composition (Y), the solid content percentage of the intermediate coated film is suitably adjusted to fall within the range of usually from 70 to 100 mass %, preferably from 80 to 100 mass %, more preferably from 90 to 100 mass %, by performing the preheating above.

As for the aqueous base coating composition (Y), first, the case where the base coated film is a coated film taking on a solid color causing no change in the hue depending on the observation angle, is described. In this case, the base coated film can be formed by applying an aqueous colored base coating composition.

The aqueous colored base coating composition usually contains a color pigment. Specific examples of the color pigment include an organic pigment such as azo-based pigment, quinacridone-based pigment, diketopyrrolopyrrole-based pigment, perylene-based pigment, perinone-based pigment, benzimidazolone-based pigment, isoindoline-based pigment, isoindolinone-based pigment, azo metal chelate-based pigment, phthalocyanine-based pigment, indanthrone-based pigment, dioxazine-based pigment, threne-based pigment and indigo-based pigment; a metal oxide pigment such as titanium oxide pigment; and a carbon black pigment, and one of these pigments may be used alone, or two or more thereof may be used in combination.

In an aspect of the present invention, from the viewpoint of brightness, etc. of the multilayer coated film, the blending amount of the color pigment in the aqueous colored base coating composition is usually from 0.01 mass % to 150 mass %, preferably from 0.05 mass % to 120 mass %, relative to the total resin solids content in the aqueous colored base coating composition. The color pigment to be blended in the aqueous colored base coating composition may be blended as a powder in the coating composition, but after the color pigment is mixed and dispersed with a part of the resin component to prepare a pigment dispersion in advance, the pigment dispersion may be mixed together with the remaining resin component or other components to form a coating composition. In preparing the pigment dispersion, conventional coating composition additives such as antifoaming agent, dispersant and surface regulator may be used, if desired.

The aqueous colored base coating composition may usually contain a resin component as a vehicle. Specific examples of the resin component include those in which a base resin such as acrylic resin, polyester resin, alkyd resin and urethane resin, having a crosslinking functional group such as hydroxyl group, is used in combination with a crosslinking agent such as melamine resin, urea resin and polyisocyanate compound (including a blocked form), and these are used after being dissolved or dispersed in a solvent such as organic solvent and/or water.

Furthermore, in the aqueous colored base coating composition, a solvent such as water or organic solvent, various additives such as dispersant, antisettling agent, curing catalyst, antifoaming agent, antioxidant, ultraviolet absorber, surface regulator and rheology control agent, an extender pigment, etc. may be appropriately blended, if desired.

The aqueous colored base coating composition can be prepared by mixing and dispersing the above-described components. The solids content during coating is preferably adjusted to a range of usually 12 mass % to 60 mass %, preferably from 15 mass % to 50 mass %, based on the coating composition.

The aqueous colored base coating composition may be adjusted to a viscosity appropriate for the coating by adding water, an organic solvent, etc. and then applied by electrostatic coating, air spray, airless spray or other methods and from the viewpoint of smoothness, the film thickness is usually from 5 µm to 30 µm, preferably from 5 µm to 25 µm, more preferably from 10 µm to 25 µm, based on the cured coated film.

Next, the case where the base coated film is a coated film taking on a metallic color causing a change in the hue depending on the observation angle, is described. In this case, the base coated film can be formed by applying an aqueous metallic base coating composition as the aqueous base coating composition (Y).

The aqueous metallic base coating composition usually contains a flake-like effect pigment with the purpose of imparting a particle feeling to the coated film. As the flake-like effect pigment, one kind or a combination of two or more kinds may be appropriately selected from light reflecting pigments and light interference pigments.

Specific examples of the light reflecting pigment include a flake-like metal pigment such as aluminum, copper, nickel alloy and stainless steel, a flake-like metal pigment in which the surface is coated with metal oxide, a flake-like metal pigment in which color pigment is chemically adsorbed or bonded to the surface, and a flake-like aluminum pigment in which an aluminum oxide layer is formed on the surface by inducing an oxidation reaction. Among these, from the viewpoint of particle feeling or finish appearance, a flake-like aluminum pigment may be suitably used.

The flake-like aluminum pigment is usually produced by grinding and milling aluminum in the presence of a liquid grinding medium with use of a grinding aid in a ball mill or an attritor mill. As the grinding aid, a higher fatty acid such as oleic acid, stearic acid, isostearic acid, lauric acid, palmitic acid and myristic acid, an aliphatic amine, an aliphatic amide, an aliphatic alcohol, etc. may be used. As the liquid grinding medium, an aliphatic hydrocarbon such as mineral spirit may be used.

The flake-like aluminum pigment can be roughly classified into a leafing type and a non-leafing type depending on the kind of the grinding aid. When the leafing-type pigment is blended in the coating composition, flakes are arranged on the surface of the coated film (leafing) obtained by applying the coating composition, giving a finish with strong metallic feeling, and since the pigment has heat-reflecting action and exerts rust-preventing power, this type is often used for various building materials including a tank, a duct, pipings and roofing of production equipment, etc. In an aspect of the present invention, a flake-like aluminum pigment of a leafing type may be used, but in the case of using a flake-like aluminum pigment of this type, attention is required, because although it varies depending on the blending amount, the pigment may completely hide the surface by the effect of surface tension of the grinding aid in the process of forming the coated film and a particle feeling may not be expressed. From this viewpoint, a flake-like aluminum pigment of a non-leafing type is preferably used.

As for the size of the flake-like aluminum pigment, from the viewpoint of finish appearance, highlight brightness and particle feeling of the multilayer coated film, a pigment having an average particle diameter of usually 8 μm to 25 μm, preferably from 10 μm to 18 μm, is preferably used, and the thickness is preferably from 0.2 μm to 1.0 μm. The particle diameter and thickness as used herein indicate the median diameter in a volume-basis particle size distribution measured by the laser diffraction scattering method by using a Microtrac particle size distribution measuring apparatus, MT3300 (trade name, manufactured by Nikkiso Co., Ltd.). If the average particle diameter is controlled to equal to or less than the upper limit above, the particle feeling of the coated film obtained can be avoided from becoming excessive, and this is advantageous in terms of design property, whereas if it is controlled to equal to or more than the lower limit, the particle feeling can be sufficient.

In the aqueous metallic base coating composition, a light interference pigment may be used as the flake-like effect pigment.

As the light interference pigment, specifically, a pigment obtained by coating a semitransparent substrate, such as natural mica, artificial mica, alumina flake, silica flake and glass flake, with a metal oxide may be used.

The metal oxide-coated mica pigment is a pigment in which the substrate is natural mica or artificial mica and the substrate surface is coated with a metal oxide. The natural mica is a flake-like substrate obtained by grinding mica from ore, and the artificial mica is synthesized by heating an industrial raw material, such as $SiO_2$, MgO, $Al_2O_3$, $K_2SiF_6$ or $Na_2SiF_6$, melting the raw material at a high temperature of about 1,500° C., and cooling the melt for crystallization. In this mica, as compared with natural mica, the impurity content is small, and the size or thickness is uniform. Specifically, fluorine-type mica ($KMg_3AlSi_3O_{10}F_2$), potassium tetrasilicon mica ($KMg_{25}AlSi_4O_{10}F_2$), sodium tetrasilicon mica ($NaMg_{25}AlSi_4O_{10}F_2$), Na taeniolite ($NaMg_2LiSi_4O_{10}F_2$), LiNa taeniolite ($LiNaMg_2LiSi_4O_{10}F_2$), etc. are exemplified. Examples of the metal oxide coat include titanium oxide and iron oxide. An interference color can be developed by the metal oxide coat.

The metal oxide-coated alumina flake pigment is a pigment in which the substrate is alumina flake and the substrate surface is coated with a metal oxide. The alumina flake means a flake-like (foil-like) aluminum oxide and is colorless and transparent. The alumina flake need not be an aluminum oxide single component and may contain an oxide of other metals. Examples of the metal oxide coat include titanium oxide and iron oxide. An interference color can be developed by the metal oxide coat.

The metal oxide-coated silica flake pigment is a pigment in which flake-like silica as a substrate having smooth surface and uniform thickness is coated with a metal oxide having a refractive index different from that of the substrate. Examples of the metal oxide coat include titanium oxide and iron oxide. An interference color can be developed by the metal oxide coat.

The metal oxide-coated glass flake pigment is a pigment in which a flake-like glass substrate is coated with a metal oxide, and since the substrate surface is smooth, strong light reflection is caused to express a particle feeling. Examples of the metal oxide coat include titanium oxide and iron oxide. An interference color can be developed by the metal oxide coat.

The light interference pigment may be subjected to a surface treatment so as to enhance the dispersibility, water resistance, chemical resistance, weather resistance, etc.

As for the size of the light interference pigment, in the case of a light interference pigment using natural mica, artificial mica, alumina flake or silica flake as the substrate, from the viewpoint of finish appearance or particle feeling of the coated film, a pigment having an average particle diameter of usually 5 μm to 30 μm, preferably from 7 μm to 25 μm, may be suitably used.

In the case of a light interference pigment using glass flake as the substrate, from the viewpoint of particle feeling of the coated film, a pigment having an average particle diameter of usually 15 μm to 100 μm, preferably from 17 μm to 45 μm, may be suitably used. A light interference pigment having a thickness of usually 0.05 μm to 7.0 μm, preferably from 0.1 μm to 3 μm, is suitably used.

The particle diameter and thickness as used herein indicate the median diameter in a volume-basis particle size distribution measured by the laser diffraction scattering method by using a Microtrac particle size distribution measuring apparatus, MT3300 (trade name, manufactured by Nikkiso Co., Ltd.).

If the average particle diameter exceeds the upper limit, the particle feeling of the multilayer coated film, developed by the light interference pigment, becomes excessive, and this is sometimes disadvantageous in terms of design property, whereas if it is less than the lower limit, the particle feeling may be insufficient.

From the viewpoint of finish appearance or particle feeling of the coated film obtained, the content of the flake-like effect pigment in the aqueous metallic base coating composition is, in total, preferably from 0.01 mass % to 25 mass %, more preferably from 0.01 mass % to 15 mass %, further preferably from 0.05 mass % to 5 mass %, relative to the total solids content of the resin composition in the coating composition.

The aqueous metallic base coating composition may contain a color pigment with the purpose of adjusting the hue and brightness of the coated film obtained. Specific examples of the color pigment include an inorganic pigment, e.g., a transparent iron oxide pigment, a composite oxide pigment such as titanium yellow, a titanium oxide pigment containing fine-particle titanium oxide, and a carbon black pigment; and an organic pigment such as azo-based pigment, quinacridone-based pigment, diketopyrrolopyrrole-based pigment, perylene-based pigment, perinone-based pigment, benzimidazolone-based pigment, isoindoline-based pigment, isoindolinone-based pigment, azo-metal chelate pigment, phthalocyanine-based pigment, indanthrone-based pigment, dioxazine-based pigment, threne-based pigment and indigo-based pigment. One of these may be used alone, or two or more thereof may be used in combination.

The color pigment may be blended as a powder in the coating composition, or after the color pigment is mixed and dispersed with a part of the resin composition to prepare a pigment dispersion in advance, the pigment dispersion may be mixed together with the remaining resin component or other components to form a coating composition. In preparing the pigment dispersion, conventional coating composition additives such as antifoaming agent, dispersant and surface regulator may be used, if desired.

In the case of incorporating a color pigment into the aqueous metallic base coating composition, from the viewpoint of brightness, etc. of the multilayer coated film, the blending amount thereof is usually from 0.01 mass % to 10 mass %, preferably from 0.01 mass % to 5 mass %, relative to the total solids content of the resin composition in the coating composition.

The aqueous metallic base coating composition usually contains a resin composition as a vehicle-forming component. Specific examples of the resin composition include those in which a base resin such as acrylic resin, polyester resin, alkyd resin and urethane resin, having a crosslinking functional group such as hydroxyl group, is used in combination with a crosslinking agent such as melamine resin, urea resin and polyisocyanate compound (including a blocked form), and these are used after being dissolved or dispersed in a solvent such as organic solvent and/or water.

Furthermore, in the aqueous metallic base coating composition, a solvent such as water or organic solvent, various additives such as pigment dispersant, curing catalyst, antifoaming agent, antioxidant, ultraviolet absorber and surface regulator, a gloss control agent, an extender pigment, etc. may be appropriately blended, if desired.

The aqueous metallic base coating composition is prepared by mixing and dispersing the above-described components. The solids content during coating is preferably adjusted to a range of usually 12 mass % to 60 mass %, preferably from 15 mass % to 50 mass %, based on the coating composition.

The aqueous metallic base coating composition may be adjusted to a viscosity appropriate for the coating by adding water or an organic solvent and then applied by a conventional method such as rotary atomization coating, air spray or airless spray.

From the viewpoint of smoothness, etc. of the coated film, the coating composition is preferably applied to have a film thickness of usually 10 μm to 25 μm based on the cured coated film and may be applied to have a film thickness of more preferably from 10 μm to 20 μm, still more preferably from 13 μm to 17 μm.

The aqueous coating composition as used in an aspect of the present invention is a term contrasted with an organic solvent-based coating composition and in general, means a coating composition obtained by dispersing and/or dissolving a coated film-forming resin, a pigment, etc. in water or a medium containing water as the main component (aqueous medium).

The base resin of the resin composition of the aqueous base coating composition (Y) preferably has an acid group, and in the case of dispersion in water, from the viewpoint of enhancing water dispersibility, the acid group is preferably neutralized with a neutralizer so as to facilitate mixing and dispersion in water.

The neutralizer is not particularly limited as long as it can neutralize an acid group, and examples thereof include a basic compound such as sodium hydroxide, potassium hydroxide, trimethylamine, 2-(dimethylamino)ethanol, 2-amino-2-methyl-1-propanol, triethylamine and aqueous ammonia.

The base coated film obtained by applying the aqueous base coating composition (Y) can be cured per se, in the case of a baking drying type, usually at a temperature of about 50° C. to about 180° C., and in the case of a normal temperature drying type or a forced drying type, can be cured usually at a temperature from room temperature to about 80° C.

<Step (3)>

According to the method of the present invention, a base coated film obtained by applying the aqueous base coating composition (Y) as above is preheated under heating conditions causing substantially no curing of the coated film, and a clear coating composition (Z) is applied to the base coated film to form a clear coated film.

The preheating temperature is preferably from 40 to 100° C., more preferably from 50 to 90° C., still more preferably from 60 to 80° C. The preheating time is preferably from 30 seconds to 15 minutes, more preferably from 1 to 10 minutes, still more preferably from 2 to 5 minutes.

Before applying the clear coating composition (Z), the solid content percentage of the base coated film is suitably adjusted to fall within the range of usually from 70 to 100 mass %, preferably from 80 to 100 mass %, more preferably from 90 to 100 mass %, by performing the preheating above.

<<Clear Coating Composition (Z)>>

As the clear coating composition (Z), for example, a clear coating composition containing a carboxyl group-containing compound in the range of usually from 40 to 60 parts by mass, preferably from 45 to 55 parts by mass, and a polyepoxide in the range of usually from 60 to 40 parts by mass, preferably from 55 to 45 parts by mass, each based on 100 parts by mass of the solid content of resin components in the coating composition, can be used.

The carboxyl group-containing compound has a carboxyl group in the molecule and may have an acid value in the range of usually from 50 to 500 mgKOH/g, preferably from 80 to 300 mgKOH/g.

Examples of the carboxyl group-containing compound include the following polymers (1) to (3) and the compound (4).

[Polymer (1): A Polymer Having, in the Molecule, a Group Formed by Half-Esterifying an Acid Anhydride Group]

The group formed by half-esterifying an acid anhydride group is a group composed of a carboxyl group and a carboxylic acid ester group, obtained by adding an aliphatic monoalcohol to an acid anhydride group to effect ring opening (i.e., half esterification). Hereafter, this group is sometimes simply referred to as a half-ester group.

The polymer (1) can be easily obtained, for example, by copolymerizing a half-ester group-containing unsaturated monomer and other polymerizable unsaturated monomers in a usual manner. The polymer can also be easily obtained by performing similar copolymerization using an acid anhydride group-containing unsaturated monomer instead of the half-ester group-containing unsaturated monomer, and then half-esterifying the acid anhydride group.

Examples of the acid anhydride group-containing unsaturated monomer include maleic anhydride and itaconic anhydride. Examples of the half-ester group-containing unsaturated monomer include a monomer formed by half-esterifying an acid anhydride group of the acid anhydride group-containing unsaturated monomer. As described above, the half esterification can be performed either before or after the copolymerization reaction.

As the aliphatic monoalcohol to be used for the half esterification, examples thereof include low-molecular-weight monoalcohols such as methanol, ethanol, isopropanol, n-butanol, isobutanol, tert-butanol, ethylene glycol monomethyl ether and ethylene glycol monoethyl ether. The half esterification can be performed in accordance with a conventional method, for example, at a temperature ranging from room temperature to about 80° C. by using, if desired, a tertiary amine as a catalyst.

Examples of other polymerizable unsaturated monomers include a hydroxy group-containing unsaturated monomer, (meth)acrylic acid esters, a vinyl ether or allyl ether, an olefinic compound and a diene compound, a hydrocarbon ring-containing unsaturated monomer, a nitrogen-containing unsaturated monomer, and a hydrolyzable alkoxysilyl group-containing acrylic monomer.

Examples of the hydroxyl group-containing unsaturated monomer include a hydroxyalkyl ester having a carbon number of 2 to 8 of an acrylic acid or methacrylic acid, such as 2-hydroxyethyl (meth)acrylate, 3-hydroxypropyl (meth)acrylate and hydroxybutyl (meth)acrylate; a monoester of a polyether polyol such as polyethylene glycol, polypropylene glycol and polybutylene glycol, with an unsaturated carboxylic acid such as (meth)acrylic acid; a monoether of a polyether polyol such as polyethylene glycol, polypropylene glycol and polybutylene glycol, with a (meth)acrylic acid hydroxyalkyl ester such as 2-hydroxyethyl (meth)acrylate; a monoesterification product or diesterification product of an acid anhydride group-containing unsaturated compound such as maleic anhydride and itaconic anhydride, with glycols such as ethylene glycol, 1,6-hexanediol and neopentyl glycol; hydroxyalkyl vinyl ethers such as hydroxyethyl vinyl ether; an allyl alcohol, etc.; 2-hydroxypropyl (meth)acrylate; an adduct of α,β-unsaturated carboxylic acid with a monoepoxy compound such as "CARDURA E10P" (trade name, produced by Momentive Specialty Chemicals; a glycidyl ester of synthetic highly branched saturated fatty acid) and α-olefin epoxide; an adduct of glycidyl (meth)acrylate with a monobasic acid such as acetic acid, propionic acid, p-tert-butylbenzoic acid and fatty acids; and an adduct of the above-described hydroxy group-containing unsaturated monomer with lactones (e.g., ε-caprolactone, γ-valerolactone).

Examples of the (meth)acrylic acid esters include an alkyl ester or cycloalkyl ester having a carbon number of 1 to 24 of an acrylic acid or methacrylic acid, such as methyl acrylate, ethyl acrylate, propyl acrylate, isopropyl acrylate, n-butyl acrylate, isobutyl acrylate, tert-butyl acrylate, hexyl acrylate, 2-ethylhexyl acrylate, n-octyl acrylate, decyl acrylate, stearyl acrylate, lauryl acrylate, cyclohexyl acrylate, methyl methacrylate, ethyl methacrylate, n-propyl methacrylate, isopropyl methacrylate, n-butyl methacrylate, isobutyl methacrylate, tert-butyl methacrylate, hexyl methacrylate, 2-ethylhexyl methacrylate, octyl methacrylate, decyl methacrylate, lauryl methacrylate, stearyl methacrylate and cyclohexyl methacrylate; and an alkoxyalkyl ester having a carbon number of 2 to 18 of an acrylic acid or methacrylic acid, such as methoxybutyl acrylate, methoxybutyl methacrylate, methoxyethyl acrylate, methoxyethyl methacrylate, ethoxybutyl acrylate and ethoxybutyl methacrylate.

As the vinyl ether or allyl ether, examples thereof include chain alkyl vinyl ethers such as ethyl vinyl ether, n-propyl vinyl ether, isopropyl vinyl ether, butyl vinyl ether, tert-butyl vinyl ether, pentyl vinyl ether, hexyl vinyl ether and octyl vinyl ether; cycloalkyl vinyl ethers such as cyclopentyl vinyl ether and cyclohexyl vinyl ether; aryl vinyl ethers such as phenyl vinyl ether and trivinyl ether; aralkyl vinyl ethers such as benzyl vinyl ether and phenethyl vinyl ether; and allyl ethers such as allyl ethyl ether.

Examples of the olefinic compound and diene compound include ethylene, propylene, butylene, vinyl chloride, butadiene, isoprene, and chloroprene.

Examples of the hydrocarbon ring-containing unsaturated monomer include styrene, α-methylstyrene, phenyl (meth)acrylate, phenylethyl (meth)acrylate, phenylpropyl (meth)acrylate, benzyl (meth)acrylate, phenoxyethyl (meth)acrylate, cyclohexyl (meth)acrylate, 2-acryloyloxyethyl hydrogen phthalate, 2-acryloyloxypropyl hydrogen phthalate, 2-acryloyloxypropyl hexahydrohydrogen phthalate, 2-acryloyloxypropyl tetrahydrohydrogen phthalate, an esterification product of p-tert-butyl-benzoic acid with hydroxyethyl (meth)acrylate, and dicyclopentenyl (meth)acrylate.

Examples of the nitrogen-containing unsaturated monomer include a nitrogen-containing alkyl (meth)acrylate such as N,N-dimethylaminoethyl (meth)acrylate, N,N-diethylaminoethyl (meth)acrylate and N-tert-butylaminoethyl (meth)acrylate; polymerizable amides such as acrylamide, methacrylamide, N-methyl(meth)acrylamide, N-ethyl(meth)acrylamide, N,N-dimethyl(meth)acrylamide, N,N-dimethylaminopropyl(meth)acrylamide and N,N-dimethylaminoethyl(meth)acrylamide; an aromatic nitrogen-containing monomer such as 2-vinylpyridine, 1-vinyl-2-pyrrolidone and 4-vinylpyridine; a polymerizable nitrile such as acrylonitrile and methacrylonitrile; and an allylamine.

Examples of the hydrolyzable alkoxysilyl group-containing acrylic monomer include γ-(meth)acryloyloxypropyltrimethoxysilane, γ-(meth)acryloyloxypropylmethyldimethoxysilane, β-(meth)acryloyloxyethyltrimethoxysilane, γ-(meth)acryloyloxypropyltriethoxysilane, and γ-(meth)acryloyloxypropylmethyldiethoxysilane.

Copolymerization of the unsaturated monomer having a half-ester group or an acid anhydride group with other polymerizable unsaturated monomers can be performed using a usual polymerization method for unsaturated monomers, but in consideration of versatility and cost, it is most suitable to perform the copolymerization by a solution-type radical polymerization method in an organic solvent. For example, the copolymerization reaction is performed in a solvent, e.g., an aromatic solvent such as xylene and toluene; a ketone-based solvent such as methyl ethyl ketone and methyl isobutyl ketone; an ester-based solvent such as ethyl acetate, butyl acetate, isobutyl acetate and 3-methoxybutyl acetate; or an alcoholic solvent such as n-butanol and isopropyl alcohol, in the presence of a polymerization initiator such as azo-based catalyst or peroxide-based catalyst, at a temperature of usually from about 60 to about 150° C., and the target polymer can thereby be easily obtained.

It is typically appropriate to set the ratio of respective monomers, i.e., an unsaturated monomer having a half-ester group or an acid anhydride group and other polymerizable unsaturated monomers, to the following ratio based on total mass of all monomers. That is, from the standpoint of curability, storage stability, etc., the unsaturated monomer having a half-ester group or an acid anhydride group may be within the range of usually from 5 to 40 mass %, preferably from 10 to 30 mass %, and other polymerizable unsaturated monomers are suitably set to fall within the range of usually from 60 to 95 mass %, preferably from 70 to 90 mass %. Furthermore, out of other polymerizable unsaturated monomers, styrene is suitably used in an amount of up to about 20 mass % from the standpoint of weather resistance of the cured coated film.

The polymer (1) is preferably an acrylic polymer having a number average molecular weight of usually from 1,000 to 20,000, particularly from 1,500 to 15,000. When the number average molecular weight of the polymer is 1,000 or more, reduction in the weather resistance of the cured coated film can be suppressed, and when it is 20,000 or less, compatibility with the polyepoxide can be enhanced.

[Polymer (2): A Polymer Having a Carboxyl Group in the Molecule]

The polymer (2) can be easily obtained by copolymerizing a carboxyl group-containing unsaturated monomer with other polymerizable unsaturated monomers by the same method as in the polymer (1).

Examples of the carboxyl group-containing unsaturated monomer include acrylic acid, methacrylic acid, crotonic acid, itaconic acid, maleic acid, fumaric acid, 2-carboxyethyl (meth)acrylate, 2-carboxypropyl (meth)acrylate, and 5-carboxypentyl (meth)acrylate. Examples of other polymerizable unsaturated monomers include (meth)acrylic acid esters, a vinyl ether or allyl ether, an olefinic compound and a diene compound, a hydrocarbon ring-containing unsaturated monomer, and a nitrogen-containing unsaturated monomer, which are exemplified for the polymer (1).

From the standpoint of weather resistance of the cured coated film or compatibility with the polyepoxide (B), the polymer (2) preferably has a number average molecular weight of usually from 1,000 to 20,000, particularly from 1,500 to 15,000.

[Polymer (3): A Carboxyl Group-Containing Polyester-Based Polymer]

The carboxyl group-containing polyester-based polymer can be easily obtained by a condensation reaction of a polyhydric alcohol such as ethylene glycol, butylene glycol, 1,6-hexanediol, trimethylolpropane and pentaerythritol, with a polyvalent carboxylic acid such as adipic acid, terephthalic acid, isophthalic acid, phthalic anhydride and hexahydrophthalic anhydride. For example, the carboxyl group-containing polyester-based polymer can be obtained by a one-step reaction under the condition of blending an excess polyvalent carboxylic acid. In addition, the carboxyl group-containing polyester-based polymer can also be obtained by first synthesizing a hydroxyl group-terminated polyester-based polymer under the condition of blending an excess hydroxyl group of polyhydric alcohol, and then post-adding an acid anhydride group-containing compound such as phthalic anhydride, hexahydrophthalic anhydride or succinic anhydride.

The carboxyl group-containing polyester-based polymer (3) suitably has a number average molecular weight of usually from 500 to 20,000, particularly from 800 to 10,000.

[Compound (4): A Half Ester Produced by the Reaction of a Polyol and a 1,2-Acid Anhydride]

The half ester can be obtained by reacting a polyol with a 1,2-acid anhydride under the conditions where a ring-opening reaction of the acid anhydride occurs and a polyesterification reaction does not occur substantially, and the resulting reaction product usually has a low molecular weight and a narrow molecular weight distribution. In addition, the reaction product provides a low content of volatile organic matter in the coating composition and imparts excellent acid resistance, etc. to the formed coated film.

The half ester can be obtained, for example, by reacting a polyol with a 1,2-acid anhydride in an inert atmosphere, e.g., in a nitrogen atmosphere, in the presence of a solvent. Examples of suitable solvents include ketones such as methyl amyl ketone, diisobutyl ketone and methyl isobutyl ketone; an aromatic hydrocarbon such as toluene and xylene; and other organic solvents such as dimethylformamide and N-methylpyrrolidone.

The reaction temperature is preferably a low temperature of about 150° C. or less, and specifically, a temperature of usually from about 70 to about 150° C., particularly from about 90 to about 120° C., is preferred. The reaction time basically varies somewhat depending on the reaction temperature but may usually be approximately from 10 minutes to 24 hours.

The reaction ratio of acid anhydride/polyol can be from 0.8/1 to 1.2/1 in terms of equivalent ratio calculated when assuming a monofunctional acid anhydride, and the desired half ester can thereby be maximally obtained.

The acid anhydride used for the preparation of the desired half ester has a carbon number of 2 to 30 excluding the carbon atoms in the acid moiety. Examples of such an acid anhydride include an aliphatic acid anhydride, a cycloaliphatic acid anhydride, an olefinic acid anhydride, a cycloolefinic acid anhydride, and an aromatic acid anhydride. The acid anhydride above may have a substituent as long as it does not adversely affect the reactivity of the acid anhydride or the properties of the half ester obtained. Examples of the substituent include a chloro group, an alkyl group, and an alkoxy group. Examples of the acid anhydride include succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, alkylhexahydrophthalic anhydride (e.g., methylhexahydrophthalic anhydride), tetrafluorophthalic anhydride, endomethylenetetrahydrophthalic anhydride, chlorendic anhydride, itaconic anhydride, citraconic anhydride, and maleic anhydride.

As the polyol usable for the half esterification of the acid anhydride above, examples thereof include a polyol having a carbon number of 2 to 20, particularly a carbon number of 2 to 10, and diols, triols, and a mixture thereof are preferred. Specific examples thereof include an aliphatic polyol such as ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, 1,4-cyclohexanedimethanol, 3-methyl-1,5-pentanediol, trimethylolpropane, 2,2,4-trimethylpentane-1,3-diol, pentaerythritol, and 1,2,3,4-butanetetrol. In addition, an aromatic polyol such as bisphenol A and bis(hydroxymethyl)xylene may also be used.

The half ester may have a number average molecular weight of usually from 400 to 1,000, particularly from 500 to 900. The half ester has high reactivity with an epoxy group and thus is useful for the preparation of a high-solid-content coating composition.

The polyepoxide used in combination with the above-mentioned carboxyl group-containing compound has an epoxy group in the molecule, and a polyepoxide having an epoxy group content of usually from 0.8 to 15 mmol/g, particularly from 1.2 to 10 mmol/g, is preferred.

Examples of the polyepoxide include an epoxy group-containing acrylic polymer; an alicyclic epoxy group-containing acrylic polymer; a diglycidyl ether compound such as diglycidyl ether, 2-glycidylphenylglycidyl ether and 2,6-diglycidylphenylglycidyl ether; a compound containing a glycidyl group and an alicyclic epoxy group, such as vinylcyclohexene dioxide and limonene dioxide; and an alicyclic epoxy group-containing compound such as dicyclopentadiene dioxide, bis(2,3-epoxycyclopentyl)ether, epoxycyclohexenecarboxylic acid ethylene glycol diester, bis(3,4-epoxycyclohexylmethyl)adipate, 3,4-epoxycyclohexylmethyl-3,4-epoxycyclohexane carboxylate and 3,4-epoxy-6-methylcyclohexylmethyl-3,4-epoxy-6-methylcyclohexane carboxylate. One of these may be used alone, or two or more thereof may be used in combination.

Among these, an epoxy group-containing acrylic polymer or an alicyclic epoxy group-containing acrylic polymer each having a number average molecular weight of preferably from 1,000 to 20,000, more preferably from 1,500 to 15,000, is suitably used.

The epoxy group-containing acrylic polymer or alicyclic epoxy group-containing acrylic polymer can be easily obtained by copolymerizing an epoxy group-containing unsaturated monomer or an alicyclic epoxy group-containing unsaturated monomer with other polymerizable unsaturated monomers by the same method as in the polymer (1).

Examples of the epoxy group-containing unsaturated monomer include glycidyl (meth)acrylate and allyl glycidyl ether, and examples of the alicyclic epoxy group-containing unsaturated monomer include 3,4-epoxycyclohexylmethyl (meth)acrylate.

Examples of other polymerizable unsaturated monomers include a hydroxyl group-containing unsaturated monomer, (meth)acrylic acid esters, a vinyl ether or allyl ethers, an olefinic compound and a diene compound, a hydrocarbon ring-containing unsaturated monomer, a nitrogen-containing unsaturated monomer, and a hydrolyzable alkoxysilyl group-containing acrylic monomer, which are exemplified regarding the polymer (1).

From the standpoint of curability of the coated film, the blending ratio of the carboxyl group-containing compound to the polyepoxide in the clear coating composition (Z) is preferably controlled to fall within the range from 1/0.5 to 0.5/1, more preferably from 1/0.7 to 0.7/1, still more preferably from 1/0.8 to 0.8/1, in terms of equivalent ratio of carboxyl group in the carboxyl group-containing compound to epoxy group in the polyepoxide.

In the clear coating composition (Z), a curing catalyst may be blended, if desired. As the catalyst useful for a ring-opening esterification reaction between a carboxyl group in the carboxyl group-containing compound and an epoxy group in the epoxide, examples of the usable curing catalyst include a quaternary salt catalyst such as tetraethylammonium bromide, tetrabutylammonium bromide, tetraethylammonium chloride, tetrabutylphosphonium bromide and triphenylbenzylphosphonium chloride; and an amine compound such as triethylamine and tributylamine. Among these, a quaternary salt catalyst is suitable. Furthermore, a quaternary salt where an acidic phosphate compound such as dibutylphosphoric acid is blended in an amount substantially equivalent to the quaternary salt, is preferred in that it can enhance the storage stability of the coating composition and prevent deterioration of the suitability for spray coating due to decrease in the electric resistance, without impairing the catalytic action.

In the case of blending the curing catalyst, usually, the blending ratio thereof is preferably about 0.01 to 5 parts by mass per 100 parts by mass of the total solid content of the carboxyl group-containing compound and the polyepoxide.

The clear coating composition (Z) may further contain, if desired, a color pigment, an effect pigment, a dye, etc. to an extent not impairing transparency and may further appropriately contain an extender pigment, an UV absorber, an antifoaming agent, a thickener, a rust-preventive agent, a surface conditioner, an organic solvent, etc.

The clear coating composition (Z) can be applied to the coated film surface of the aqueous base coating composition (Y) by a method known per se, such as airless spray, air spray and rotary atomizing coater, and static electricity may be applied during application of the coating composition. The coated film thickness can be made to fall within the range of usually from 10 to 60 µm, preferably from 25 to 50 µm, in terms of cured film thickness.

In this specification, the number average molecular weight and the weight average molecular weight are a value calculated from a chromatogram measured by gel permeation chromatography, based on the molecular weight of standard polystyrene. As for the gel permeation chromatograph, "HLC8120GPC" (manufactured by Tosoh Corporation) was used. The measurement was performed using four columns of "TSKgel G-4000HXL", "TSKgel G-3000HXL", "TSKgel G-2500HXL" and "TSKgel G-2000HXL" (trade names, all manufactured by Tosoh Corporation) under the conditions of mobile phase: tetrahydrofuran, measurement temperature: 40° C., flow velocity: 1 cc/min, and detector: RI.

<Step (4)>

In the method for forming the multilayer coated film in an aspect of the present invention, the intermediate coated film, the base coated film and the clear coated film formed in the above steps (1) to (3), respectively, are heat-cured. The clear coated film formed by applying the clear coating composition (Z) is usually heat-cured simultaneously with the uncured base coated film.

The heating may be performed by a normal heating method of a coated film such as hot-air heating, infrared heating or high-frequency heating. The heating temperature is preferably from 60° C. to 180° C., more preferably from 110° C. to 170° C., still more preferably from 130° C. to 160° C. The heating time is not particularly limited but is preferably from 10 minutes to 90 minutes, more preferably from 15 minutes to 60 minutes, still more preferably from 15 minutes to 30 minutes.

Before heat-curing, preheating may be appropriately performed. The preheating temperature is preferably from 40° C. to 110° C., more preferably from 50° C. to 110° C., and the preheating time is preferably from 30 seconds to 15 minutes, more preferably from 1 minute to 10 minutes.

By this heating, the multilayer coated film including an intermediate coated film, a base coated film and a clear coated film layer can be cured.

In the multilayer coated film obtained by the method of the present invention, from the viewpoint of finish appearance, the film thickness is preferably from 70 µm to 120 µm, more preferably from 80 µm to 100 µm, based on the cured coated film.

In the method of the present invention, in a part of an automotive body (for example, a portion to which front glass or rear glass is fixed), an adhesive layer may be formed on the clear coated film of the multilayer coated film including the intermediate coated film, the base coated film and the clear coated film, obtained in the steps (1) to (4). The embodiments of the step (5) are described below.

<Step (5)>

In the method of the present invention, in order to bond the automobile main body to a glass member, etc., an adhesive layer is formed on the clear coated film, usually in a frame shape corresponding to the shape of a glass member to be fixed.

As the adhesive for forming the adhesive layer, a resin composition usually used as an adhesive, a sealing agent or a coating agent, for example, urethane-based, acryl-based, silicone-based, modified silicone-based, polysulfide-based, epoxy-based and PVC-based adhesives, may be used.

Among these, from the viewpoint of adhesion to the clear coated film and high weather resistance, a urethane-based adhesive is preferably used. The urethane-based adhesive may be sufficient if it is an adhesive having an isocyanate group, and the adhesive may be any of a thermosetting adhesive, a thermoplastic adhesive, etc. and examples thereof include an adhesive containing methylene-bis(p-phenylene diisocyanate), hexamethylene diisocyanate, 1,6-hexamethylene diisocyanate, 2,4-tolylene diisocyanate, toluene diisocyanate, 1-chlorophenyl diisocyanate, 1,5-naphthylene diisocyanate, thiodipropyl diisocyanate, ethylbenzene-α-2-diisocyanate, or 4,4',4"-triphenylmethane triisocyanate. As for the urethane-based adhesive, either one-pack type or two-pack type may be used, but in particular, a one-pack moisture-curable urethane-based adhesive is suitably used.

Specific examples of the adhesive include "3740", "3765T" and "560F" (all trade names) produced by Sunstar Inc.; "WS373", "WS282", "WS202" and "WS252" (all trade names) produced by Yokohama Rubber Co., Ltd.; and "58702SFL" and "58702SFH" (both trade names) produced by Dow Chemical.

The method for applying the adhesive is not particularly limited, but from the viewpoint of productivity, in the automotive production line, coating by a robotic painting machine is widely performed in general. As for the coating amount of the adhesive, the adhesive is preferably applied to a film thickness of usually approximately from 3 mm to 6 mm based on the cured coated film.

In the case of bonding the multilayer coated film to a glass member, by the step (5), an adhesive layer is formed usually in a frame shape corresponding to the shape of a glass member to be fixed, on a part of an electrodeposition coated automotive body, a glass member such as front glass or rear window is laid thereon, and the adhesive layer is cured, whereby the glass member is fixed to the automotive body.

EXAMPLES

An aspect of the present invention is described more specifically below by referring to Examples and Comparative Examples. However, the present invention is not limited only to the following Examples. Here, both "parts" and "%" are on a mass basis, and the thickness of the coated film is based on the cured coated film.

In addition, the number average molecular weight of the resin is a value as measured by gel permeation chromatography (GPC) by using the calibration curve of standard polystyrene.

Production of Hydroxyl Group-Containing Acrylic Resin (A)

Production Example a1

35 Parts of propylene glycol monopropyl ether was added to a flask, and the temperature was raised to 85° C. A mixture of 10 parts of 2-hydroxyethyl methacrylate, 20 parts of styrene, 22 parts of isobutyl methacrylate, 42 parts of n-butyl methacrylate, 6 parts of acrylic acid, 15 parts of propylene glycol monopropyl ether, and 2.0 parts of 2,2'-azobis(2,4-dimethylvaleronitrile) was added dropwise to the flask over 4 hours and after the completion of dropwise addition, the mixture was aged for 1 hour. Subsequently, a mixture of 10 parts of propylene glycol monopropyl ether and 1 part of 2,2'-azobis(2,4-dimethylvaleronitrile) was further added dropwise to the flask over 1 hour and after the completion of dropwise addition, the mixture was aged for 1 hour. Thereafter, 7.4 parts of diethanolamine and 13 parts of propylene glycol monopropyl ether were further added to obtain a hydroxyl group-containing acrylic resin (A1) having a solid content concentration of 55%. The hydroxyl group-containing acrylic resin (A1) obtained had a glass transition temperature of 5° C., a weight average molecular weight of 35,000, a hydroxyl value of 43 mgKOH/g, and an acid value of 47 mg KOH/g.

Production Examples a2 to a6

Solutions of hydroxyl group-containing acrylic resins (A2) to (A6) having a solid content concentration of 55% were obtained in the same manner as in Production Example a1 except that the blending formulation of the monomer mixture and the reaction temperature were changed as shown in Table 1. The glass transition temperature, weight average molecular weight, hydroxyl value and acid value of each of the hydroxyl group-containing acrylic resins are shown together in Table 1.

TABLE 1

| | | (parts by mass) | | | | | |
|---|---|---|---|---|---|---|---|
| Production Example | | a1 | a2 | a3 | a4 | a5 | a6 |
| Name of hydroxyl group-containing acrylic resin (A) | | A1 | A2 | A3 | A4 | A5 | A6 |
| Hydroxyl group-containing unsaturated monomer | 2-Hydroxyethyl methacrylate | 10 | 10 | 10 | | 10 | |
| | 2-Hydroxyethyl acrylate | | | | 9 | | 9 |
| Other unsaturated monomers | Styrene | 20 | 20 | 20 | 10 | 10 | 25 |
| | Isobutyl methacrylate | 22 | 29 | 35 | 35 | 38 | 30 |
| | n-Butyl acrylate | 42 | 35 | 29 | 40 | 36 | 30 |
| | Acrylic acid | 6 | 6 | 6 | 6 | 6 | 6 |
| Polymerization initiator | 2,2'-Azobis(2,4-dimethylvaleronitrile) | 2 | 2 | 2 | 1.5 | 3.5 | 1.5 |
| Reaction temperature [° C.] | | 85 | 85 | 85 | 85 | 85 | 85 |
| Glass transition temperature [° C.] | | 5 | 14 | 21 | 0 | 10 | 15 |
| Weight average molecular weight | | 35,000 | 34,000 | 33,000 | 34,000 | 25,000 | 45,000 |
| Hydroxyl value [mgKOH/g] | | 43 | 43 | 43 | 44 | 43 | 44 |
| Acid value [mgKOH/g] | | 47 | 47 | 47 | 47 | 47 | 47 |

Production of Aqueous Intermediate Coating Composition (X)

Production Example x1

36 Parts (resin solid content: 20 parts) of the hydroxyl group-containing acrylic resin (A1) obtained in Production Example a1, 90 parts of "JR-806" (trade name, produced by Tayca Corporation, rutile titanium dioxide), 0.1 parts of "Carbon MA-100" (trade name, produced by Mitsubishi Chemical Corporation, carbon black), and 5 parts of deionized water were mixed and after adjusting the pH to 8.0 with 2-(dimethylamino)ethanol, the mixture was dispersed by means of a paint shaker for 30 minutes to obtain a pigment dispersion paste. Subsequently, 131 parts of the obtained pigment dispersion paste, 10 parts of the polyurethane resin (B1), 30 parts of hydroxyl group-containing polyester resin (C1), 30 parts of melamine resin (D1), and 10 parts of active methylene-blocked polyisocyanate compound (E1), each shown below, were uniformly mixed. To the obtained mixture, "UH-752" (trade name, produced by ADEKA Co., Ltd., thickener), 2-(dimethylamino)ethanol, and deionized water were added to obtain an aqueous intermediate coating composition (X1) having a viscosity of 45 seconds as measured with Ford cup No. 4 at 20° C.

Production Examples x2 to x9 and Comparative Production Examples x1 to x7

Aqueous intermediate coating compositions (X2) to (X16) having a viscosity of 45 seconds as measured with Ford cup No. 4 at 20° C. were obtained in the same manner as in Production Example x1 except that respective raw materials were changed to raw materials each having the composition shown in Table 2 below. Here, the blending amount of each component is the amount (parts) of solid contents.

Polyurethane Resin (B1): "Superflex E-4800" (trade name, produced by Dai-Ichi Kogyo Seiyaku Co., Ltd., a polyurethane resin having a polyether skeleton, glass transition temperature of −65° C.)

Polyurethane Resin (B2): "Superflex E-2000" (trade name, produced by Dai-Ichi Kogyo Seiyaku Co., Ltd., a polyurethane resin having a polyester skeleton, glass transition temperature of −38° C.)

Hydroxyl Group-Containing Polyester Resin (C1): Obtained by using trimethylolpropane, cyclohexanedimethanol, isophthalic acid and adipic acid and performing an esterification reaction in a usual manner; number average molecular weight: 4,500, hydroxyl value: 120, acid value: 10.

Melamine Resin (D1): Imino group-containing methylbutyl mixed etherified melamine; weight average molecular weight: 1,200.

Active Methylene-Blocked Polyisocyanate Compound (E1):

360 parts of "SUMIDUR N-3300" (trade name, Sumika Bayer Urethane Co., Ltd., polyisocyanate having a hexamethylene diisocyanate-derived isocyanurate structure, solids content: about 100%, isocyanate group content percentage: 21.8%), 60 parts of "Uniox M-550" (produced by NOF Corporation, polyethylene glycol monomethyl ether, average molecular weight: about 550), and 0.2 part of 2,6-di-tert-butyl-4-methylphenol were added to a reaction vessel equipped with a thermometer, a thermostat, a stirrer, a reflux condenser, a nitrogen inlet tube, a dropper, and a simple trap for the removed solvent, then thoroughly mixed, and heated under a nitrogen stream at 130° C. for 3 hours. Subsequently, 110 parts of ethyl acetate, and 252 parts of diisopropyl malonate were added, and 3 parts of a 28% methanol solution of sodium methoxide was added thereto with stirring under a nitrogen stream, followed by stirring at 65° C. for 8 hours. The amount of isocyanate in the obtained resin solution was 0.12 mol/kg. Furthermore, 683 parts of 4-methyl-2-pentanol was added thereto, and while keeping the temperature of the system at 80 to 85° C., the solvent was distilled off under reduced pressure over 3 hours to obtain 1,010 parts of active methylene-blocked polyisocyanate compound (E1). In the simple trap for the removed solvent, 95 parts of isopropanol was contained. The solid content concentration of the active methylene-blocked polyisocyanate compound (E1) was about 60%.

<Production of Aqueous Base Coating Composition (Y)>
(Production of Effect Pigment Concentrate)

In a stirring mixer, 19 parts of aluminum pigment paste "GX-180A" (trade name, produced by Asahi Kasei Metals Co., Ltd., metal content: 74%), 35 parts of 2-ethyl-1-hexanol, 8 parts of a phosphate group-containing resin solution (note 1), and 0.2 parts of 2-(dimethylamino)ethanol were uniformly mixed to obtain the effect pigment concentrate (P-1).

(Note 1) Phosphate group-containing resin solution: A mixed solvent of 27.5 parts of methoxypropanol and 27.5 parts of isobutanol was put in a reaction vessel equipped with a thermometer, a thermostat, a stirrer, a reflux condenser and a dropper and heated at 110° C., and 121.5 parts of a mixture containing 25 parts of styrene, 27.5 parts of n-butyl methacrylate, 20 parts of "Isostearyl Acrylate" (trade name, produced by Osaka Organic Chemical Industry, Ltd., branched higher alkyl acrylate), 7.5 parts of 4-hydroxybutyl acrylate, 15 parts of phosphate group-containing polymerizable monomer (note 2), 12.5 parts of 2-methacryloyloxyethyl acid phosphate, 10 parts of isobutanol and 4 parts of tert-butyl peroxyoctanoate was added to the mixed solvent above over 4 hours. A mixture containing 0.5 parts of tert-butyl peroxyoctanoate and 20 parts of isopropanol was further added dropwise over 1 hour, and the resulting mixture was aged with stirring for 1 hour to obtain a phosphate group-containing resin solution having a solid content concentration of 50%. In this resin, the acid value by the phosphate group was 83 mgKOH/g, the hydroxyl value was 29 mgKOH/g, and the weight average molecular weight was 10,000.

(Note 2) Phosphate group-containing polymerizable monomer: 57.5 Parts of monobutylphosphoric acid and 41 parts of isobutanol were put in a reaction vessel equipped with a thermometer, a thermostat, a stirrer, a reflux condenser and a dropper and after raising the temperature to 90° C., 42.5 parts of glycidyl methacrylate was added dropwise over 2 hours. The resulting mixture was further aged with stirring for 1 hour and thereafter, 59 parts of isopropanol was added to obtain a phosphate group-containing polymerizable monomer solution having a solid content concentration of 50%. In the monomer obtained, the acid value by the phosphate group was 285 mgKOH/g.

(Production of Aqueous Base Coating Composition (Y1))

100 Parts (solid content: 30 parts) of the hydroxyl group-containing acrylic acid aqueous dispersion (i), 73 parts (solid content: 40 parts) of the hydroxyl group-containing water-soluble acrylic resin (ii), 62 parts of the effect pigment concentrate (P-1), and 37.5 parts (solid content: 30 parts) of "CYMEL 325" (trade name, produced by ALLNEX LTD., melamine resin, solid content: 80%) were uniformly mixed, and "PRIMAL ASE-60" (trade name, produced by Rohm &

Haas Co., thickener), 2-(dimethylamino)ethanol and deionized water were added thereto to obtain the aqueous base coating composition (Y1) having a pH of 8.0, a solid content concentration of coating composition of 25%, and a viscosity of 40 seconds as measured with Ford cup No. 4 at 20° C.
Hydroxyl Group-Containing Acrylic Acid Aqueous Dispersion (i):

130 Parts of deionized water and 0.52 parts of "AQUALON KH-10" (trade name, produced by Dai-ichi Kogyo Seiyaku Co., Ltd., polyoxyethylene alkyl ether sulfate ester ammonium salt, active ingredient: 97%) were added to a reaction vessel equipped with a thermometer, a thermostat, a stirrer, a reflux condenser, a nitrogen inlet tube and a dropper, and stirred/mixed in a nitrogen stream, and the temperature was raised to 80° C. Subsequently, a 1% portion of the total amount of the monomer emulsion (1) shown below and 5.3 parts of an aqueous 6% ammonium persulfate solution were introduced into the reaction vessel, and the system was kept at 80° C. for 15 minutes. The remaining monomer emulsion (1) was then added dropwise over 3 hours to the reaction vessel kept at the same temperature. After the completion of dropwise addition, the mixture was aged for 1 hour.

Furthermore, the monomer emulsion (2) shown below was added dropwise over 1 hour and after aging for 1 hour, the mixture was cooled to 30° C. while gradually adding 40 parts of an aqueous 5% 2-(dimethylamino)ethanol solution to the reaction vessel and filtered through a 100-mesh nylon cloth to obtain, as a filtrate, the hydroxyl group-containing acrylic resin aqueous dispersion (i) having an average particle diameter of 120 nm (as measured using a submicron particle size distribution analyzer "COULTER Model N4" (manufactured by Beckman Coulter, Inc.) at 20° C. after dilution with deionized water) and a solid content concentration of 30%. The hydroxyl group-containing acrylic resin aqueous dispersion (i) had an acid value of 33 mg KOH/g and a hydroxyl value of 25 mg KOH/g.

Monomer Emulsion (1):

42 Parts of deionized water, 0.72 parts of "AQUALON KH-10", 2.1 parts of methylenebisacrylamide, 2.8 parts of styrene, 16.1 parts of methyl methacrylate, 28 parts of ethyl acrylate, and 21 parts of n-butyl acrylate were mixed with stirring to obtain the monomer emulsion (1).

Monomer Emulsion (2):

18 Parts of deionized water, 0.31 parts of "AQUALON KH-10", 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed with stirring to obtain the monomer emulsion (2).

Hydroxyl Group-Containing Water-Soluble Acrylic Resin (ii):

35 Parts of propylene glycol monopropyl ether was added to a flask, and the temperature was raised to 85° C. Subsequently, a mixture of 30 parts of methyl methacrylate, 20 parts of 2-ethylhexyl acrylate, 29 parts of n-butyl acrylate, 15 parts of hydroxyethyl acrylate, 6 parts of acrylic acid, 15 parts of propylene glycol monopropyl ether, and 2.3 parts of 2,2'-azobis(2,4-dimethylvaleronitrile) was added dropwise to the flask over 4 hours, and after the completion of dropwise addition, the mixture was aged for 1 hour. Then, a mixture of 10 parts of propylene glycol monopropyl ether and 1 part of 2,2'-azobis(2,4-dimethylvaleronitrile) was further added dropwise to the flask over 1 hour and after the completion of dropwise addition, the mixture was aged for 1 hour. Thereafter, 7.4 parts of diethanolamine was further added to obtain the hydroxyl group-containing water-soluble acrylic resin (ii) having a solid content concentration of 55%, an acid value of 47 mg KOH/g, and a hydroxyl value of 72 mg KOH/g.

<Production of Clear Coating Composition (Z)>
(Production of Carboxyl Group-Containing Compound)

680 Parts of "SWASOL 1000" (trade name, produced by Cosmo Oil Co., Ltd., hydrocarbon-based organic solvent) was added to a reaction vessel equipped with a thermometer, a thermostat, a stirrer, a reflux condenser, a nitrogen gas inlet tube and a dropper, and the temperature was raised to 125° C. under a flow of nitrogen gas. After the temperature reached 125° C., the flow of nitrogen gas was stopped, and the following monomer mixture was added dropwise at a constant rate over 4 hours. Here, p-tert-butylperoxy-2-ethylhexanoate is a polymerization initiator.

Monomer mixture: 500 Parts of styrene, 500 parts of cyclohexyl methacrylate, 500 parts of isobutyl methacrylate, 500 parts of maleic anhydride, 1,000 parts of 2-ethoxyethyl propionate, and 100 parts of p-tert-butylperoxy-2-ethylhexanoate were mixed with stirring to obtain a monomer mixture.

Subsequently, the mixture obtained above was aged at 125° C. for 30 minutes while flowing nitrogen gas, and a mixture of 10 parts of p-tert-butylperoxy-2-ethylhexanoate and 80 parts of "SWASOL 1000" was further added dropwise over 1 hour. The resulting mixture was then cooled to 60° C. and after adding 490 parts of methanol and 4 parts of triethylamine, followed by subjecting to a half-esterification reaction under heating and refluxing for 4 hours. Thereafter, 326 parts of excess methanol was removed under reduced pressure to obtain a carboxyl group-containing compound solution having a solid content of 55%. The carboxyl group-containing compound had a number average molecular weight of 3,500 and an acid value of 130 mg KOH/g.

(Production of Polyepoxide)

410 Parts of xylene and 77 parts of n-butanol were added to a reaction vessel equipped with a thermometer, a thermostat, a stirrer, a reflux condenser, a nitrogen gas inlet tube and a dropper, and the temperature was raised to 125° C. under a flow of nitrogen gas. After the temperature reached 125° C., the flow of nitrogen gas was stopped, and the following monomer mixture was added dropwise at a constant rate over 4 hours. Here, azobisisobutyronitrile is a polymerization initiator.

Monomer mixture: 432 Parts (30%) of glycidyl methacrylate, 720 parts (50%) of n-butyl acrylate, 288 parts (20%) of styrene, and 72 parts of azobisisobutyronitrile were mixed with stirring to obtain a monomer mixture.

Subsequently, the mixture obtained above was aged at 125° C. for 30 minutes while flowing nitrogen gas, and a mixture of 90 parts of xylene, 40 parts of n-butanol, and 14.4 parts of azobisisobutyronitrile was further added dropwise over 2 hours. The resulting mixture was then aged for 2 hours to obtain a polyepoxide solution having a solid content of 70%. The obtained polyepoxide had a number average molecular weight of 2,000 and an epoxy group content of 2.12 mmol/g.

(Production of Clear Coating Composition (Z))

91 Parts (solid content: 50 parts) of the carboxyl group-containing compound solution obtained above, 71 parts (solid content: 50 parts) of the polyepoxide solution obtained above, 1 part of "TBAB" (trade name, produced by LION AKZO, tetrabutylammonium bromide, active ingredient: 100%), and 0.2 parts of "BYK-300" (trade name, produced by BYK-Chemie, surface conditioner, active ingredient: 52%) were uniformly mixed, and SWASOL 1000 (trade name, produced by Cosmo Oil Co., Ltd., hydrocarbon-based solvent) was further added to obtain the clear coating composition (Z1) having a viscosity of 25 seconds as measured with Ford cup No. 4 at 20° C.
<Preparation of Test Plate>
(Preparation of Test Material to be Coated)

An alloyed hot-dip galvanized steel plate subjected to zinc phosphate treatment was electrodeposition-coated with "ELECRON GT-10" (trade name, produced by Kansai Paint Co., Ltd., thermosetting epoxy resin-based cationic electrodeposition coating composition) to a film thickness of 20 μm and cured by heating at 170° C. for 30 minutes to prepare a test material to be coated.

Example 1

(1) The aqueous intermediate coating composition (X1) obtained above was applied to the test material to be coated by a hand spray gun so as to provide a cured coated film of 15 μm, then allowed to stand for 5 minutes, and preheated at 80° C. for 3 minutes. Subsequently, the aqueous base coating composition (Y1) obtained above was applied to the intermediate coated film by a hand spray gun so as to provide a cured film thickness of 10 μm, then allowed to stand for 5 minutes, and preheated at 80° C. for 3 minutes.

Thereafter, the clear coating composition (Z1) prepared above was applied to the uncured base coated film by a hand spray gun so as to provide a cured film thickness of 25 μm, then allowed to stand for 7 minutes, and heated at 140° C. for 30 minutes, and the whole of the multilayer coated film was thus heat-cured to prepare a test plate.

The test plate was further coated with a urethane-based adhesive (trade name: "3740", produced by Sunstar Inc., wind-shielding agent for automobiles) so as to provide a coated shape having a width of 20 mm, a thickness of 3 mm, and a length of 100 mm or more and after putting a release paper thereon, uniformly pressed with a flat plate. The flat plate was removed, and the test plate was then allowed to stand at a temperature of 23±2° C. and a humidity of 50±5% for 72 hours to cure the adhesive. After that, the release paper was peeled to prepare the test plate A for WDB (glass adhesion) test.

(2) The aqueous intermediate coating composition (X1) obtained above was applied to the test material to be coated by a hand spray gun so as to provide a cured coated film of 20 μm, then allowed to stand for 5 minutes, and preheated at 80° C. for 3 minutes. Subsequently, the aqueous base coating composition (Y1) obtained above was applied to the intermediate coated film by a hand spray gun so as to provide a cured film thickness of 15 μm, then allowed to stand for 5 minutes, and preheated at 80° C. for 3 minutes.

Thereafter, the clear coating composition (Z1) obtained above was applied to the uncured base coated film by a hand spray gun so as to provide a cured film thickness of 35 μm, then allowed to stand for 7 minutes, and heated at 140° C. for 30 minutes, and the whole of the multilayer coated film was thus heat-cured to prepare the test plate B for chipping resistance test.

Examples 2 to 9 and Comparative Examples 1 to 7

Each test plate (two kinds) was prepared in the same manner as in Example 1 except that the aqueous intermediate coating composition (X1) was changed to the aqueous intermediate coating compositions (X2) to (X16), respectively.

With respect to each of the test plates obtained, the WDB adhesion (glass adhesion) and chipping resistance tests were performed based on the following test methods and evaluation methods. In addition, the elongation at break, Young's modulus and Tukon hardness of the intermediate coated film were also measured by the above-described measurement methods. The test results are shown together in Table 2.
<WDB Adhesion (Glass Adhesion)>

After each test plate A prepared above was immersed in a constant-temperature water bath set at 40° C. for 240 hours and then cooled by immersing it in water at 23° C. for 1 hour, the following peel test was performed.

A cut reaching the coated film surface was formed at an angle of about 60° relative to the coated film by a cutter knife at intervals of 2 to 3 mm while manually pulling the cured adhesive layer in the direction at 90° or more relative to the coated film. The peeled state after peeling the adhesive layer was evaluated in accordance with the following criteria "AA", "A", "B", and "C".

AA: Separation of the adhesive layer was not observed, and exposure of the coated film was not observed either.

A: The coated film was not broken and only the adhesive layer was separated by causing cohesion failure, but adhesion of the coated film to the adhesive layer was substantially maintained.

B: The coated film was separated by causing cohesion failure.

C: Separation was observed at the interface between the coated film and the adhesive layer.
<Chipping Resistance>

The test plate B was placed on a sample holder of a flying stone chipping tester Model JA-400 (chipping test device) manufactured by Suga Test Instruments Co., Ltd., and 50 g of crushed granite stone with a particle size of No. 7 was hit against the test plate B at an angle of 45° by blowing compressed air at 0.392 MPa (4 kgf/cm$^2$) from a distance of 30 cm at −20° C. Thereafter, the resulting test plate B was washed with water and dried, and a cloth adhesive tape (produced by Nichiban Co., Ltd.) was stuck to the coating surface. After peeling off the tape, scratch occurrence, etc. on the coated film were observed with an eye and evaluated in accordance with the following criteria.

AA: The scratch size was extremely small, and the electrodeposition surface or raw steel plate was not exposed.

A: The scratch size was small, and the electrodeposition surface or raw steel plate was not exposed.

B: The scratch size was small, but the electrodeposition surface or raw steel plate was exposed.

C: The scratch size was considerably large, and the raw steel plate was also largely exposed.

TABLE 2

| | | | | | (parts by mass) | | | | | | | | |
|---|---|---|---|---|---|---|---|---|---|---|---|---|---|
| | | | Tg | | | Example | | | | | | | |
| | | | (° C.) | Mw | 1 | 2 | 3 | 4 | 5 | 6 | 7 | 8 | 9 |
| Aqueous intermediate coating | Pigment dispersion paste | Hydroxyl group-containing acrylic resin (A1) | 5 | 35,000 | 20 | 20 | 20 | 20 | 20 | | | | |

TABLE 2-continued

| composition | Hydroxyl group-containing acrylic resin (A2) | 14 | 34,000 | | | | | | 20 | 20 | 20 | 20 |
|---|---|---|---|---|---|---|---|---|---|---|---|---|
| | Hydroxyl group-containing acrylic resin (A3) | 21 | 33,000 | | | | | | | | | |
| | Hydroxyl group-containing acrylic resin (A4) | 0 | 34,000 | | | | | | | | | |
| | Hydroxyl group-containing acrylic resin (A5) | 10 | 25,000 | | | | | | | | | |
| | Hydroxyl group-containing acrylic resin (A6) | 15 | 45,000 | | | | | | | | | |
| | Hydroxyl group-containing polyester resin (C1) "JR-806" | | | 90 | 90 | 90 | 90 | 90 | 90 | 90 | 90 | 90 |
| | "Carbon MA-100" | | | 0.1 | 0.1 | 0.1 | 0.1 | 0.1 | 0.1 | 0.1 | 0.1 | 0.1 |
| | Hydroxyl group-containing acrylic resin (A1) | 5 | 35,000 | | 5 | 10 | | 10 | | | | |
| | Hydroxyl group-containing acrylic resin (A2) | 14 | 34,000 | | | | | | | 10 | | 10 |
| | Hydroxyl group-containing acrylic resin (A3) | 21 | 33,000 | | | | | | | | | |
| | Hydroxyl group-containing acrylic resin (A4) | 0 | 34,000 | | | | | | | | | |
| | Hydroxyl group-containing acrylic resin (A5) | 10 | 25,000 | | | | | | | | | |
| | Hydroxyl group-containing acrylic resin (A6) | 15 | 45,000 | | | | | | | | | |
| | Polyurethane resin (B1) | −65 | polyether skeleton | 10 | 10 | 10 | 10 | 10 | 10 | 10 | 10 | 10 |
| | Polyurethane resin (B2) | −38 | polyester skeleton | | | | | | | | | |
| | Acryl/polyurethane ratio | | | 20/10 | 25/10 | 30/10 | 20/10 | 30/10 | 20/10 | 30/10 | 20/10 | 30/10 |
| | Hydroxyl group-containing polyester resin (C1) | | | 30 | 25 | 20 | 30 | 20 | 30 | 20 | 30 | 20 |
| | Melamine resin (D1) | | | 30 | 30 | 30 | 25 | 25 | 30 | 30 | 25 | 25 |
| | Active methylene-blocked polyisocyanate compound (E1) | | | 10 | 10 | 10 | 15 | 15 | 10 | 10 | 15 | 15 |
| | Aqueous intermediate coating composition | | | X1 | X2 | X3 | X4 | X5 | X6 | X7 | X8 | X9 |
| | Aqueous base coating composition | | | Y1 | Y1 | Y1 | Y1 | Y1 | Y1 | Y1 | Y1 | Y1 |
| | Clear coating composition | | | Z1 | Z1 | Z1 | Z1 | Z1 | Z1 | Z1 | Z1 | Z1 |
| Physical properties of coated film | Elongation [%] | | | 26 | 23 | 21 | 29 | 26 | 22 | 20 | 25 | 23 |
| | Young's modulus [MPa] | | | 5,200 | 5,500 | 6,000 | 5,000 | 5,200 | 5,800 | 5,900 | 5,500 | 5,600 |
| | Tukon Hardness | | | 5.0 | 5.5 | 5.8 | 4.8 | 5.1 | 5.7 | 5.7 | 5.4 | 5.5 |
| Evaluation results | WDB Adhesion | | | A | AA | AA | A | A | AA | AA | A | AA |
| | Chipping resistance | | | AA | AA | A | AA | AA | A | A | AA | AA |

(parts by mass)

| | | | Tg (° C.) | Mw | Comparative Example |||||||
|---|---|---|---|---|---|---|---|---|---|---|---|
| | | | | | 1 | 2 | 3 | 4 | 5 | 6 | 7 |
| Aqueous intermediate coating composition | Pigment dispersion paste | Hydroxyl group-containing acrylic resin (A1) | 5 | 35,000 | 20 | | 20 | | | | |
| | | Hydroxyl group-containing acrylic resin (A2) | 14 | 34,000 | | | | | | | 10 |
| | | Hydroxyl group-containing acrylic resin (A3) | 21 | 33,000 | | 20 | | | | | |
| | | Hydroxyl group-containing acrylic resin (A4) | 0 | 34,000 | | | | 20 | | | |

TABLE 2-continued

| | | | | | | | | | |
|---|---|---|---|---|---|---|---|---|---|
| Hydroxyl group-containing acrylic resin (A5) | 10 | 25,000 | | | | | | 20 | |
| Hydroxyl group-containing acrylic resin (A6) | 15 | 45,000 | | | | | | 20 | |
| Hydroxyl group-containing polyester resin (C1) | | | | | | | | | 10 |
| "JR-806" | | | 90 | 90 | 90 | 90 | 90 | 90 | 90 |
| "Carbon MA-100" | | | 0.1 | 0.1 | 0.1 | 0.1 | 0.1 | 0.1 | 0.1 |
| Hydroxyl group-containing acrylic resin (A1) | 5 | 35,000 | 20 | | | | | | |
| Hydroxyl group-containing acrylic resin (A2) | 14 | 34,000 | | | | | | | |
| Hydroxyl group-containing acrylic resin (A3) | 21 | 33,000 | | | | | | | |
| Hydroxyl group-containing acrylic resin (A4) | 0 | 34,000 | | | | | | | |
| Hydroxyl group-containing acrylic resin (A5) | 10 | 25,000 | | | | | | | |
| Hydroxyl group-containing acrylic resin (A6) | 15 | 45,000 | | | | | | 10 | |
| Polyurethane resin (B1) | −65 | polyether skeleton | 10 | 10 | | 10 | 10 | 10 | 10 |
| Polyurethane resin (B2) | −38 | polyester skeleton | | | 10 | | | | |
| Acryl/polyurethane ratio | | | 40/10 | 20/10 | 20/10 | 20/10 | 20/10 | 30/10 | 10/10 |
| Hydroxyl group-containing polyester resin (C1) | | | 10 | 30 | 30 | 30 | 30 | 20 | 30 |
| Melamine resin (D1) | | | 30 | 30 | 30 | 30 | 30 | 30 | 30 |
| Active methylene-blocked polyisocyanate compound (E1) | | | 10 | 10 | 10 | 10 | 10 | 10 | 10 |
| Aqueous intermediate coating composition | | | X10 | X11 | X12 | X13 | X14 | X15 | X16 |
| Aqueous base coating composition | | | Y1 | Y1 | Y1 | Y1 | Y1 | Y1 | Y1 |
| Clear coating composition | | | Z1 | Z1 | Z1 | Z1 | Z1 | Z1 | Z1 |
| Physical properties of coated film | Elongation [%] | | 11 | 9 | 15 | 35 | 34 | 17 | 35 |
| | Young's modulus [MPa] | | 7,000 | 8,000 | 6,500 | 4,000 | 4,500 | 6,500 | 4,200 |
| | Tukon Hardness | | 6.5 | 7.5 | 6.0 | 3.4 | 3.8 | 6.2 | 3.3 |
| Evaluation results | WDB Adhesion | | AA | AA | AA | C | B | AA | B |
| | Chipping resistance | | C | C | B | A | B | B | B |

As seen from the results in Table 2, in all of Examples 1 to 9, a multilayer coated film having good performance in terms of both the chipping resistance and the adhesion to a glass member could be formed. On the other hand, in Comparative Examples 1 to 7, it was impossible to satisfy both the chipping resistance and the adhesion to a glass member.

While the present invention has been described in detail and with reference to specific embodiments thereof, it will be apparent to one skilled in the art that various changes and modifications can be made therein without departing from the spirit and scope thereof.

What is claimed is:

1. A method for forming a multilayer coated film on an electrodeposition-coated alloyed hot-dip galvanized steel plate, the method comprising the following steps (1) to (6):

step (1): applying an aqueous intermediate coating composition (X) to an electrodeposition coated film, thereby forming an intermediate coated film on the electrodeposition coated film;

step (2): after preheating, applying an aqueous base coating composition (Y) to the intermediate coated film, thereby forming a base coated film on the intermediate coated film;

step (3): after preheating, applying a clear coating composition (Z) containing from 40 to 60 parts by mass of a carboxyl group-containing compound and from 60 to 40 parts by mass of a polyepoxide, each based on 100 parts by mass of a solid content of resin components in the coating composition, to the base coated film, thereby forming a clear coated film on the base coated film;

step (4): heat-curing the intermediate coated film formed in the step (1), the base coated film formed in the step (2) and the clear coated film formed in the step (3);

step (5): forming an adhesive layer on the clear coated film, and step (6): laying a glass member on the adhesive layer, wherein the aqueous intermediate coating composition (X) contains a hydroxyl group-containing acrylic resin (A) having a glass transition temperature (Tg) of 5 to 15° C. and a weight average molecular weight of 30,000 to 40,000, a polyurethane resin (B) having a glass transition temperature (Tg) of −50° C. or less and having a polyether skeleton, a hydroxyl group-containing polyester resin (C), a melamine resin (D), and an active methylene-blocked polyisocyanate compound (E), a ratio of the hydroxyl group-containing acrylic resin (A) to the polyurethane resin (B) is from 20/10 to 30/10 in terms of solid content ratio, and the heat-cured coated film of the aqueous intermediate coating composition (X) has an elongation at break at 20° C. of 20 to 30%, a Young's modulus of 5,000 to 6,000 MPa, and a Tukon hardness of 4 to 6, and the aqueous base coating composition (Y) is applied to have a film thickness of 15 μm to 25 μm based on the cured coated film.

2. The method according to claim 1, wherein the polyepoxide has an epoxy group content of 0.8 to 15 mmol/g.

* * * * *